PARSE_ERROR: image too complex

AUTOMATION OF CONTACT WORKFLOW AND AUTOMATED SERVICE AGENTS IN CONTACT CENTER SYSTEM

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

A service provider can use the physical computing resources of data centers to implement a computing environment that receives connections from remote computing devices over one or more communication networks, such as the Internet. Security services can control these connections, and the service provider can make various remote computing services available to authorized users of connected devices. Some computing resource service providers offer contact center systems and services that implement, in the data center resources, virtualized contact centers for connecting customers and other individuals and entities to service agents who are trained to solve customer service issues. Contact centers can facilitate contacts on various communication platforms, such as voice calls, online chat sessions, and the like.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
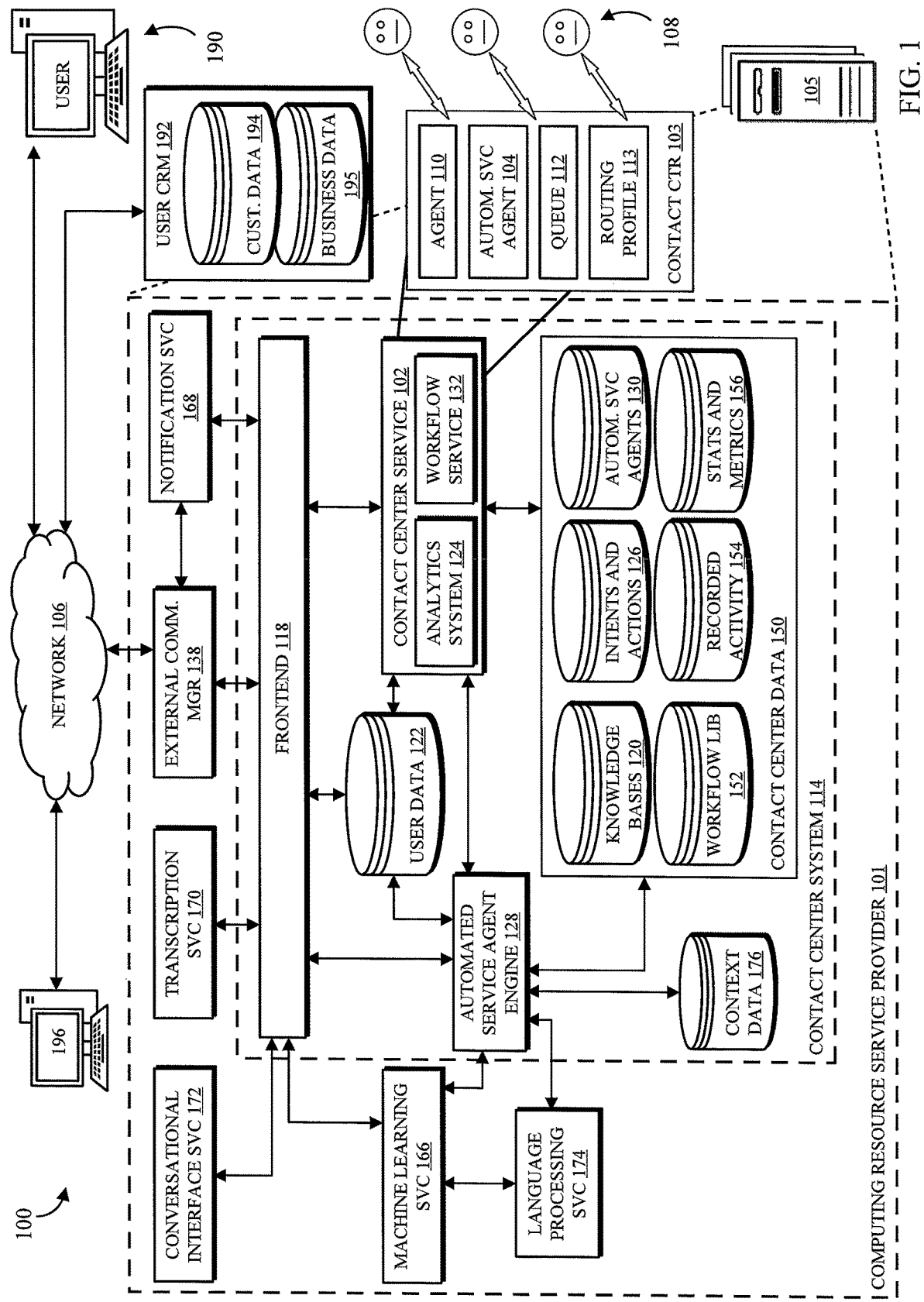
FIG. 1 is a diagram of an example system for providing a contact center system having automated generation of computerized service agents, in accordance with some embodiments of the disclosed subject matter.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Techniques described and suggested herein relate to automatically identifying and/or executing tasks of a contact center system, which tasks are associated with satisfying a customer service issue expressed by an entity contacting a virtualized contact center for help (hereinafter a "customer," though other types of entities can contact a contact center). Moreover, the described systems and methods generate a contact workflow comprising workflow states that each include instructions for executing the tasks or sub-tasks of the tasks; the workflow states are connected in a progression by which execution of the contact workflow is expected to resolve the customer service issue. A computing resource service provider, such as a company or other organization, may operate computing resources in which the contact center system is implemented and made available to users of the computing resource service provider. For example, the computing resource service provider may establish a computing environment using physical and/or virtual communication networks, sub-networks, physical and virtual network interfaces, application programming interfaces (APIs), consoles and other user interfaces, and other physical and/or virtualized computing resources; the computing environment may include or provide access to the contact center system, and users of remote computing devices can connect to the computing environment and use the various services of the contact center system. The computing environment and/or the contact center system can have access controls and other security measures associated therewith; a user can subscribe to various computing services in order to obtain access to the contact center system, and account data for the user may be used to determine whether a user has permission to access, add, delete, read, or modify resources in the computing environment. Additionally, the contact center system can use the user's subscriptions, or other access methods, to apply functionality of other computing resource service provider services to the contact workflow and automated service agent generation processes described herein.

The contact center system provides subsystems for deploying a contact center for a user, enabling service agents of the user to log into the contact center, enabling customers to initiate a contact at the contact center, recording activity associated with the contact, analyzing recorded data to identify metrics, patterns, etc., and generating contact workflows and automated service agents. Actions performed on the contact center system or by the contact center system with any other services may be stored.

Any of the recorded activity may be associated with some or all of the entities that the activity involves. The system may store the activity data in a log or add it to a substantially real-time activity feed for each of the associated entities. Thus, each entity may have associated therewith (e.g., stored in its user account data) a list of all the actions that it has performed or has had performed on it. The records may be time-limited, and may be organized in any suitable fashion enabling sorting, filtering, searching, exporting, etc. In some cases, such as in a recording of a call or a transcription thereof, the log describes the contact's "workflow" as executed within the contact center system.

A contact workflow is the course of operations performed to satisfy a customer service issue presented in a contact. In some cases, certain operations may be required to be performed in order to complete the contact workflow (i.e., to satisfy the contact). In these cases, at least a portion of the contact workflow—the tasks that must be completed to complete the required operations—may be automatically executable, depending on the implementation of a computerized agent to execute them. However, building and configuring automated service agents (aka "bots") to handle customer problems is expensive and time consuming, requiring businesses to understand what problems they can handle and to integrate with existing systems in order to surface the relevant data and take action. Further, businesses need to build the same intent collection and system integration multiple times: in the self-service bots they expose to their customers, and in the tools (CRM) that they provide to their agents.

The present disclosure describes a contact center system that can be implemented in, or for use with, a computing resource architecture (i.e., "computing environment") of a computing resource service provider to collect and aggregate activity of all of the users of the contact center system, analyze the aggregated activity to identify behavior patterns of various users, identify, using the behavior patterns, tasks and/or interactions that are consistently repeated, and create and deploy automated routines for performing or facilitating the user's performance of the identified tasks/interactions.

The contact center system may aggregate the activity data described in the log information in various ways, in order to produce one or more activity data sets that can be analyzed for usage patterns across all or a subset of the users, all or a subset of activity types, certain dates and/or durations of time, and combinations thereof. In some embodiments, the system may aggregate the activity by user, or by user group, over a rolling time window (e.g., 24 hours) that incorporates data of multiple consecutive logging periods (e.g., 24 one-hour periods). In some embodiments, the system may aggregate together all activity on a first contact center with all activity on some or all of the other contact centers associated with other users. In some embodiments, the system may aggregate other user data or system data into the activity data.

The contact center system can use the aggregated activity data and, optionally, other user information and/or system information to identify behavior patterns of service agents and customers, the behavior patterns being defined by metrics determined from the activity.

The contact center system may create and maintain a data store containing predictive data describing anticipated activity of various users based on the identified behavior patterns. The predictive data may include pattern data describing the identified behavior patterns. For example, the system may identify, for a first user, a plurality of users that each have a relatively high frequency of shared interactions with the first user; the system may store, as predictive data or pattern data, information identifying the plurality of users as members of a personal network of the first user. Additionally or alternatively, the system may apply one or more machine learning and/or other data modeling techniques to the pattern data and/or the aggregated activity data to produce the predictive data. For example, the system may perform a market basket analysis of the activity-based metrics in the pattern data to identify combinations of actions that are highly likely to be performed by a user close together in time; the system may generate, as predictive data, a data model including instructions to the system or one of its subsystems to take one or more actions in response to the user performing one or more of the actions in the identified combinations. When new aggregated activity data or pattern data is available, the system may re-apply the data modeling technique(s) to integrate the new data into the predictive data and update the corresponding data model.

Finally, the system may use the predictive data to identify and configure one or more predictive actions designed to reduce the amount of collaborative activity that a particular user must manually perform, for example to further a contact workflow. In some embodiments, a predictive action may be automatically performed by the system, recommended by the system to the user (i.e., in a notification sent to a console, user interface, or remote device), or both (i.e., recommended in the notification, and then automatically performed when the recommendation is accepted). In some embodiments, the type and parameters of a predictive action may be determined from log information, aggregated activity data of the user, or behavior pattern data. In the above market basket data model example, the predictive actions may include monitoring for the user's performance of a first action in the combination, and then either automatically performing the other actions in the combination, or waiting a predetermined time for the user to perform the action and, if the actions are not performed, performing the actions or notifying the user that the actions are typically performed. Additionally or alternatively, the system may use the predictive data to identify predicted activity that is expected to be performed by one or more other users at or near a particular time or in response to another action.

The system may produce feedback, automatically and/or based on user input, that indicates whether predictive actions were accurate. Feedback validating the selection of the predictive actions may be generated in response to the system performing an automated action, as well as in response to a user accepting the system's recommendation to perform a predictive action. In contrast, if an automated action fails or is aborted or canceled, or if the user does not perform or schedule the predictive action, negative feedback may be generated. The feedback may be incorporated into the predictive data using appropriate data modeling technique(s). Feedback and/or results of predictive analysis may be used to provide insights on subsequent projects. For example, at the beginning of the contact workflow, the system may use the data model, pattern data, or other previously generated predictive data to identify users that are required to collaborate on the workflow, users that should not be included in the project, an expected amount of time required to complete the project, an expected amount of time a particular user will spend on the project, and the like; the system may track the progress of the contact workflow against the predictions and provide alerts and other updates to a project manager or administrative user. The system may make the predictive data available to the users, such as by providing an API to the predictive data store and/or to a subsystem that has access to the predictive data, or by streaming (e.g., through a notification service to which users subscribe) to a particular user some or all of the predictive data relevant to that user.

FIG. 1 depicts an example of a system 100 for providing a contact center system 114 that, in accordance with some embodiments of the disclosed subject matter, implements a virtualized contact center 103 through which existing and/or potential customers 108 of a business connect to customer service agents of the business, and customer service agents access electronic data to help customers 108 resolve customer service issues. While the detailed examples provided are generally associated with customer-initiated service platforms, as used herein, a contact center 103 may be any implementation of a customer engagement platform, including without limitation: an inbound call center, where customers call a service phone number and reach agents 104, 110 who can service a customer request; an outbound call center, where agents 104, 110 call phone numbers of known and/or potential customers 108 (e.g., sales calls, service checkins, customer satisfaction surveying); a combination inbound/outbound contact platform; an online chat platform, with an interface presented to the customer in a software application or on a website; or, an email contact platform.

The contact center system 114 may collect and evaluate data describing activity of one, some, or all users and/or usage of resources of the contact center system 114 to identify patterns in the activity/usage, analyzes the patterns to determine predictable future interactions between users and customers and actions upon data generated, stored, or accessible by the system 114, associates the predicted interactions with workflow states to produce a contact workflow, and generates and configures automated service agents that execute the workflow to service a customer 108 contact without human intervention and/or to reduce the amount and/or improve the accuracy of actions a human service agent would otherwise perform manually to execute the contact workflow. The contact center system 114 may be a service, or a system that enables contact center services, of a computing resource service provider; the contact center system 114 executes in a computing environment 101 of the computing resource service provider, and some or all of the users of the contact center system 114 may be users of the computing resource service provider. The contact center system 114 may connect to and communicate with other systems and services of the computing environment 101, as described further below. In some embodiments, system 100 can include or communicate with computing devices 190 associated with users, such as a business entity, with a user account at the computing resource service provider that is associated with a contact center 103 generated within computing resources of the contact center system 114. In some embodiments, system 100 can include or communicate with computing devices 196 associated with "agent users," such as employees of the business entity, that use a personal or business computing device 196 to access and use the contact center system 114 to perform their roles as human service agents 110 servicing contacts from customers 108 to the contact center 103.

As discussed briefly above, contact centers 103 may allow for customers to contact businesses and organizations, generally via telephone calls, but other methods may be used for customers to contact the contact center 103. For example, the contact center 103 may be configured for contact by customers via an Internet Protocol (IP) address or an application programming interface (API). A unique application (app) based identifier may be provided to allow for app based access to the contact center 103, rather than by telephone number. Thus, an ingress point for entry into the contact center 103 may be defined in a number of ways, for example through phone calls or by applications, and the described examples herein are not meant to be limiting. For example, contacts can be inbound or outbound agent-customer connections, and calls should not be limited to phone calls.

In some embodiments, calls come into the contact center from customers 108 and, if an appropriate agent 110 is not available to handle the call, the call may be routed to a call queue 112. One or more agents 110 may be associated with specific call queues 112 and thus, calls may be routed from the call queues 112 to an appropriate agent 110 based upon a routing profile 113 defined at the contact center 103. Interactions between the customer 108 and an agent 110 may be recorded, as well as other data related to incoming calls, and therefore data storage is generally required for the contact center 103 and may be provided by a data storage service. In various configurations, data and other metrics related to customer contacts and service agent performance may be stored for a variety of purposes, including billing purposes, performance evaluations, and automatic generation of automated service agents and contact workflows as described herein.

Users, including "administrative" users that control operations of an associated contact center 103 and agent users that staff the contact center 103, as well as other services of the provider's computing environment 101, may exchange many different types of data with the system 114 in order to configure and deploy the contact center 103 and service customer issues. "Activity data" describing the users' "activity" may include data describing and/or resulting from interactions the users have with the system 114. Some interactions and their associated activity data may be relevant to the establishment and/or execution, by one or more users, of a contact workflow within the system 114. Non-limiting examples of such interactions and their data include: creating and changing the contact center 103 and settings thereof (i.e., by the administrative user); manually creating a contact workflow (e.g., using an interface to a workflow service 132 as described below); manually creating an automated service agent to execute a contact workflow and integrating the automated service agent into the contact center 103; logging into the system 114, by a human service agent, and joining the currently active service agents in the contact center 103; servicing a customer contact by claiming a queued contact request and using a system 114 interface to interact (i.e., converse) with the customer 108 (e.g., by phone communication, text-based chat, video or audio conference over IP, etc.); and, accessing various data stores to obtain and/or modify data relevant to a customer 108 contact. Activity data can also include data describing automated usage of the system 114, such as data aggregation and/or analysis operations executed by an analytics system 124, or operations of an automated service agent to service a customer contact. The system 114 may detect, monitor, and analyze some or all of the activity on the system 114, and may record raw collected data, analyzed and/or aggregated data, and other data describing the monitored activity in one or more data stores.

In some embodiments, the system 114 may associate a contact center 103, a user account, or both, with contact center data 150 comprising one or more such data stores that are configured to store the contact center data specific to the user/contact center 103. Such contact center data 150 can be partitioned from the same such data associated with other users and/or contact centers, and can be encrypted and/or can have permission-based secure access. Additionally or alternatively, various types of contact center data, such as aggregated anonymized data or metrics derived therefrom, may be stored in public or semi-private data stores in the system 114, and can be made accessible to all or a subset of users/contact centers for the purpose of data analytics. For example, intents identified by an automated service agent engine 128 as described below may be stored in the user-specific contact center data 150, and may also be anonymized and stored in a global or industry-specific database of intents. Any of the contact center data 150 may be stored and/or arranged as electronic files, databases, lookup tables, and/or any other suitable data structure for storing the corresponding type(s) of data.

Non-limiting examples of contact center data 150 are illustrated in FIG. 1. Data stores for contact center data 150 can store one or more knowledge bases 120 and context data 176; alternatively, knowledge bases 120 or other contact center data 150 may reference the context data 176, which may be stored in a data store associated with the automated service agent engine 128 and/or with a language processing service 174 of the computing resource service provider, as described further below. Context data 176 includes data defined to contextualize interactions with respect to a service agent 104/110 and/or customer 108, as well as other systems or services associated with the computing environment 101. For example, context data 176 may be defined with respect to user account data 122, such as a user identifier or user client device 196, or by another approach. User account data 122 encapsulate data associated with the administrative/corporate user as well as its associated user agents. User account data 122 may comprise, for example, login information such as usernames or passwords to authenticate a user. The user account data 122 may also comprise contact information such as a mailing address, email address, phone number or other contact information. Additionally, the user account data 122 may comprise data representing payment instruments used to consummate a financial transaction, including credit cards, debit cards, banking accounts, prepaid accounts, or other payment instruments. User account data 122 may also comprise user preferences embodying settings, configurations, or other preferences used in interactions with the contact center system 114 or other systems or services. User account data 122 may also include data enabling interactions with systems external to the environment 101. For example, the corporate user may operate an external CRM 192 storing customer data 194 and business data 195; the system 114 may use user account data 122 to exchange data with the CRM 192.

A knowledge base 120 may encapsulate records of data accessible to or modifiable by a service agent. For example, the knowledge base 120 may include a searchable catalog of items sold by a business. In another example the knowledge base 120 may contain records for various business logic rules, such as one or more customer policies (e.g., for cancellations or returns and exchanges). The knowledge base 120 may also include articles or other entries embodying information accessible by customers 108 through a service agent 110. The knowledge base 120 may also include other information.

Data stores for contact center data 150 can store intents and actions 126, including data records describing various recognized intents and their associated actions. An intent is a detectable component of a natural language input provided by a customer 108 that represents the reason for the customer contact and implicates the customer's desire for the service agent to perform an action or set of actions to satisfy the intent. For example, a natural language input of "I need help with my phone" may express an intent for needing assistance with a product. A record for an intent may store one or more detectable input elements, such as a spoken word or phrase, which identify the intent. An intent may further have one or more attributes identified by the corresponding record. The values for the intent attributes may be detectable in the natural language input, or the absence of a value for an attribute may be detected. For example, a natural language input of "Where is the order I placed yesterday?" identifies an intent to obtain an order status and references intent attributes "order ID" (with no value given) and "order date" (with the value "yesterday" given). An intent can be expressly defined by user input, or may be discovered by analyzing recorded activity and metrics of the system 114 as described further below.

The record for the intent may store information describing the corresponding action(s) that the service agent can take to satisfy the intent; the information may be the operations associated with an action, or may be a reference to another data record storing the details of the action. An action can include natural language responses to be provided to the customer in response to receiving the intent. An action can include one or more computer functions to execute, such as APIs for obtaining or modifying data. An action can require certain data elements in order to be performed. For example, the action may require values for some or all of the intent attributes to be identified by the customer 108, such as when the action calls an API and must pass attribute values to the API to obtain the associated data.

Data stores for contact center data 150 can store a workflow library 152, recorded activity 154, and service statistics and metrics 156. Workflow library 152 may include a stored library of previously created workflows (e.g., IVR workflows, chat workflows, SMS workflows, etc.) that may be loaded into the interactive contact run-time environment of a contact center service 102 executing the contact center 103. In some implementations, a contact workflow may be made up of multiple instruction blocks, where each instruction block may include a prompt (e.g., an audio voice recording prompt) to be provided to a caller, as well as one or more commands to be executed based on the response provided by the caller to the prompt. In some implementations, the instruction block may not include a prompt, but may include commands and/or instructions that can be executed based on data collected during previously executed instruction blocks or other environmental parameters captured by contact center service 102 rather than in response to a prompt. In some workflows, a command may initiate another instruction block within the contact workflow.

In one embodiment, contact center service 102 may include a workflow service 132 that provides interfaces for creating and editing workflows in a graphical environment. For example, responsive to a request from device 190 to load a contact workflow from a stored library of contact workflows (e.g., workflow library 152), the workflow service 132 may then provide a graphical representation of the contact workflow for display in a GUI of device 190. In some implementations, the contact workflow may be provided so that the instruction blocks of the workflow are presented as visual objects within the GUI. For example, each instruction block may be displayed as a box that includes a description of the prompt (if present) for that instruction block as well as any acceptable values for responses to that prompt.

Figure 6:
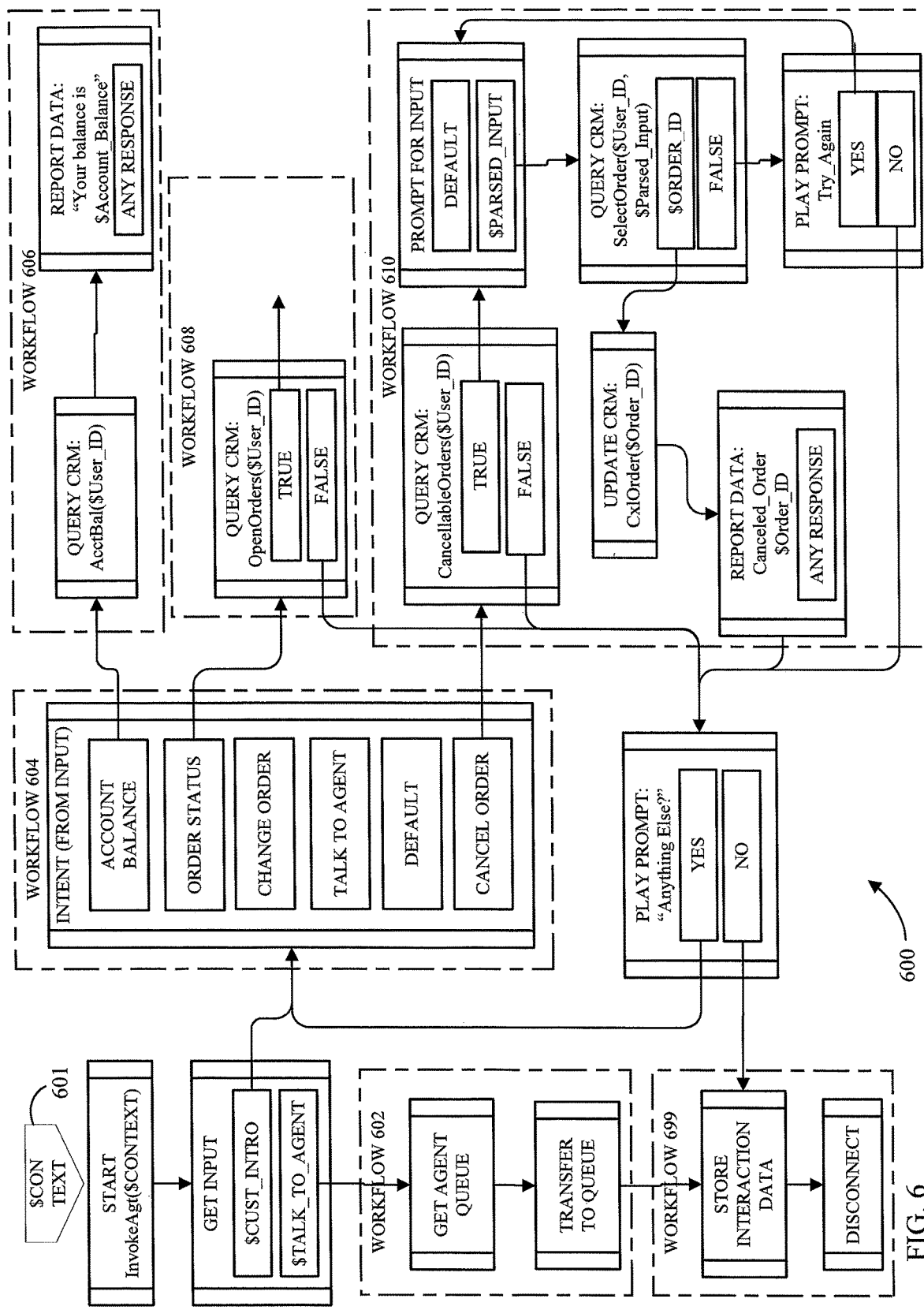
FIG. 6 is a diagram of an example set of workflows executable by a corresponding set of computerized service agents.

Additionally, an instruction block that includes a command to execute a second instruction block may be displayed with an arrow or connector line between the box representing the first instruction block and the box representing the second instruction block. An example is illustrated in FIG. 6.

Recorded activity 154 may include data for previously recorded/captured interactions between service agents and customers, where service agents are executing known or unknown contact workflows. For example, for interactive voice response (IVR) workflows, recorded interactions 154 may include response data for previously recorded/captured interactions between callers and an IVR workflow that is accessible to a caller by the use of a publicly available telephone number associated with the workflow. Similarly, for chat workflows, recorded activity 154 may include online chat correspondence between a customer contact and the chat workflow. The recorded activity 154 may include a version number/identifier for the workflow, an identifier for each of the instruction blocks in the workflow, an identifier for each of the prompts (if present) that were played for a caller, the response provided by the caller to each prompt, a listing of the order of the prompts encountered by a caller (e.g., the workflow path of a caller), or any similar information.

Service statistics and metrics 156 may include generated statistical summary information for various elements of the recorded activity 154. As described in further detail below, service statistics and metrics 156 may store a statistical distribution of information collected by each instruction block within a workflow. In some implementations, service statistics and metrics 156 may store a statistical distribution of the responses provided for a prompt in an IVR workflow over a specified period of time. For example, for a prompt that has three possible acceptable response values, IVR statistics may store the percentage of callers that selected the first response value, the percentage of callers that selected the second response value, and the percentage of callers that selected the third response value. Service statistics and metrics 156 may include aggregated processing metrics such as call transfer rate, repeat contact rate, and other metrics that describe the effectiveness and efficiency of previously executed contact workflows and the service agents that executed them. Service statistics and metrics 156 may also include metrics associated with contact center 103 performance but not based on activity data. For example, the system 114 or another service may administer a customer satisfaction survey program, and raw or analyzed aggregate customer satisfaction scores may be stored in statistics and metrics 156. The information stored in service statistics and metrics 156 may be displayed in user interfaces to graphically illustrate the historical call traffic over time for a particular IVR workflow; such information may further be used in automated processes for discovering workflow states and the components thereof, and for generating, modeling, and improving programs and control data that implement automated service agents, as described herein.

In some embodiments, the plurality of parameters of each interaction may include a timestamp of the interaction, and the metrics may include a time-based metric that is based on the timestamp. To perform the predictive analysis, the system may calculate, as the measured value of the time-based metric, a time of day and/or a window of time in which the first interaction is likely to be performed; the system may schedule the automated interaction to be executed at the identified time of day or within the window. In some embodiments, the plurality of parameters of each interaction may include an interaction type, and the metrics may include an activity-based metric that is based on the interaction type. For example, the metric may measure the frequency of a given user agent's servicing of some or all of the different types of interactions that can be performed on the system. To perform the predictive analysis, the system may determine the interaction type of each of the interactions of interest and calculate, as the measured value of the activity-based metric, the frequency for each of the types. To determine that the first interaction can be automated, the system may determine that the frequency of a first interaction type is indicative of the behavior pattern. For example, if in a high percentage of contacts of a first type, the service agent performs a first action immediately after receiving the intent, the system may determine that an automated service agent for that intent can automatically perform the first action when invoked.

The contact center system 114 may include a contact center service 102 and/or a system implementing a contact center service, and an automated service agent engine 128 in electronic communication with each other and cooperating to perform the automated service agent generation and deployment functions of the present invention. The contact center system 114 may make necessary computing resources available for the contact center service 102 to launch a contact center 103 and process and record the activity of the users. In addition or alternatively to storing the recorded activity 154, the contact center service 102 may generate activity data, such as event messages containing information about interactions, that is immediately processed by a data analytics system 124 when an interaction is requested, initiated, denied, interrupted, completed, etc. The event messages may include the parameters of the interaction (i.e., those necessary to create an interaction record), as described above. The data analytics system 124 may receive the event messages and produce records from them; such records may comprise recorded activity 154, statistics and metrics 156, etc. The data analytics system 124 may collect and compile various combinations of such activity data pertaining to one or more users, one or more user groups, one or more customers, one or more types of business, one or more types of contact, or any combination thereof, across any duration or period of time of interest. For example, the data analytics system 124 may obtain user agent activity and produce activity logs for a single user agent, or a subgroup of user agents, or all of the user agents, for each logging period over the course of one month (in some embodiments allowing logs older than one month to be automatically deleted).

The data analytics system 124 may use any suitable data aggregation method to compile various data sets of interest. In some embodiments, the data sets may be compiled by summation of the occurrences of values for one or more focus parameters. For example the data analytics system 124 may summarize a first user agent's interactions with customers during the period of interest, and using the length of the period of interest may produce an interaction frequency of each customer. In some embodiments, the activity data may be aggregated in an unconstrained manner, such that the data analytics system 124 produces frequencies of all parameters in the data set. In other embodiments, the data analytics system 124 may be configured to aggregate the activity data without a particular algorithm, or using an algorithm that does not specify the patterns to be detected.

The data analytics system 124 may produce one or more aggregated data sets comprising the compiled data. In some embodiments, a single aggregated data set is produced, comprising all of the monitored activity data occurring during the time period of interest. Additionally or alternatively, context-specific aggregated data sets associated with a particular user or group of users, or with a particular customer or issue/problem, or with a particular time period, may be created. The data analytics system 124 may store the aggregated data sets in suitable storage locations for the corresponding types of contact center data 150. In some embodiments, the data analytics system 124 may send aggregated data sets to the automated service agent engine 128; in other embodiments, the automated service agent engine 128 may request the data from the data analytics system 124 or obtain the data from the contact center data 150 and/or the user data store 122 or another data store.

The automated service agent engine 128 may include a machine learning engine and/or may be configured to apply one or more machine learning or other data modeling algorithms to aggregated data sets, real-time activity data, company data such as business logic rules (e.g., policies, contact center performance goals) and customer account info, and other user information and/or system information to identify patterns in the servicing of contacts. In some embodiments, the automated service agent engine 128 may be trained, using supervised or unsupervised learning, to identify the patterns according to features or metrics determined from the activity. For example, the automated service agent engine 128 may use a feature vector in which elements correspond to parameters associated with particular types of interactions; values in the feature vector may correspond to a frequency of occurrence of the feature, or may themselves be arrays of values for the feature, such as an array of user identifiers. In another example, the automated service agent engine 128 may use a plurality of feature vectors each associated with a parameter associated with a target type of interaction, and the elements of the feature vectors may be frequencies of occurrence of particular values of the parameter within the aggregated data set.

In some embodiments, the automated service agent engine 128 may be configured to identify one or more specific patterns in recorded activity 154. In particular, the patterns may pertain to a set of interactions with the system 114 that occur while a service agent 110 is assisting a customer 108 through the contact center 103. Patterns may be detected from the execution of contact workflows that share some repetitive properties; or, patterns of interactions may be detected in a set of recorded contacts that were not serviced according to a known contact workflow. For example, the automated service agent engine 128 may discover an intent that is not stored in the intents and actions 126, or that does not have a workflow associated with it, by detecting a phrase that is contained in the natural language input recorded from a customer 108 immediately following a prompt (e.g., "how may I help you?") presented by the service agent 110, in a threshold number (or rate) of recorded contacts. The automated service agent engine 128 may be configured to search for deeper differentiation based on patterns within patterns. For example, once a previously unknown intent is discovered, the automated service agent engine 128 may identify the actions the service agent performs in response to detecting the intent, and may further determine for example, how intent attribute values affect which action, from a plurality of possible actions that could follow the intent, is selected for performance, and/or which intent attributes must have defined (e.g., customer-supplied) values in order to perform an action.

The automated service agent engine 128 may produce (e.g., as output of the machine learning engine or the corresponding data modeling algorithms) predictive data such as intent records and/or action records that may be stored as intents and actions 126. Additionally or alternatively, the predictive data may include one or more data models representing aspects of the analyzed aggregate activity with respect to a model contact workflow or a plurality of model contact workflows created for different classes of intent, different types of customer, different types of service agent, etc. A data model may include identification of workflow states comprising tasks and/or interactions that are likely to be performed by the service agent and/or likely responses from the customer, when other conditions are present in the contact workflow. For example, the automated service agent engine 128 may perform a market basket analysis of activity-based metrics in the pattern data to identify combinations or sequences of actions that are highly likely to be performed by a service agent close together in time; the automated service agent engine 128 may generate, as predictive data, a data model including instructions to the system or one of its subsystems to take one or more actions in response to the user performing one or more of the actions in the identified combinations. When new aggregated activity data or pattern data is available, the system may re-apply the data modeling technique(s) to integrate the new data into the predictive data and update the corresponding data model. In some embodiments, the automated service agent engine 128 may determine various parameters for classifiers, feature vectors, and other data elements for configuring machine learning algorithms to operate on the aggregated activity data. In some embodiments, the computing resource service provider may provide in the environment 101 one or more machine learning services 166 that the automated service agent engine 128 communicates with. The automated service agent engine 128 may send the aggregated activity data and the configuration parameters to the machine learning service 166, receiving back the data model, pattern data, and other predictive data.

The automated service agent engine 128 may use corresponding data model(s) to automatically generate one or more candidate contact workflows based on the same workflow structure used in contact workflows stored in the workflow library 152. In some embodiments, a candidate contact workflow may be generated from an existing contact workflow, such as a workflow template or a workflow stored in the library 152. A candidate contact workflow may also be entirely newly generated. The automated service agent engine 128 may generate candidate contact workflows for an entire contact, or for only a subset of a contact, such as for an intent. The automated service agent engine 128 may incorporate other user data into the data model to refine candidate workflows and their composite workflow states. For example, statistics and metrics 156 may include information describing rates at which the contact is serviced to the customer's satisfaction when a candidate contact workflow or a similar workflow is used, and the automated service agent engine 128 may use these rates to determine whether to modify or rearrange workflow states. The automated service agent engine 128 may generate several candidate contact workflows for the same intent, each being slightly different from the others in order to test the candidate's effectiveness and efficiency. Through testing and refinement, an optimal contact workflow may be identified. The optimal and candidate workflows may be stored in the workflow library 152.

The automated service agent engine 128 may further use the data models and/or generated contact workflows to generate one or more automated service agents 104, also known as "chatbots," and to configure the automated service agents 104 to execute one or more contact workflows, or part of a contact workflow. In some embodiments, the automated service agent engine 128 may identify the APIs needed to perform each possible action for an intent, and may enable an automated service agent 104 to execute the APIs. For example, the automated service agent 104 may comprise a data structure stored in a data store of automated service agents 130, and the data structure may store program instructions for executing the APIs, as described further below. The contact center service 102 may integrate an automated service agent 104 into the contact center 103, such as by executing integration code that allocates virtual computing resources for an instance of the automated service agent 104 and launches the automated service agent 104 into the allocated resources. The automated service agent 104 may then operate using suitable interfaces for receiving a request for customer service, initiating the contact with the corresponding customer, communicating with the customer via segments of scripted speech associated with the workflow states, processing natural language inputs in real-time to determine customer responses, and calling the associated API(s) to perform indicated actions.

In some embodiments, an automated service agent 104 may be associated with a discovered intent, and may be invoked (e.g., an instance of the agent 104 may be launched into the call center 103) when the corresponding intent is detected in the customer input. The automated service agent 104 may execute the contact workflow for the corresponding intent in real-time interaction with the customer 108. Alternatively, the automated service agent engine 128 or the contact center service 102 may retrieve the corresponding data structures for the intent's associated contact workflow (e.g., from workflow library 152) and automated service agent 104 (e.g., from agent store 130) and may use the automated service agent 104 to execute some or all of the contact workflow without human intervention. This may supplement, streamline, replace, or otherwise improve the efficiency of various interactions of the user that, as indicated by the identified behavior patterns, are suitably predictable with respect to a given contact type, customer, time of day/year, etc. At the end of the workflow execution, the contact may not be fully serviced, and may be transitioned to a human agent. The engine 128 may configure a user interface on the human agent's device 196 to display information about the workflow execution and present a set of available options that the human can perform next.

The contact center service 102 may produce feedback, automatically and/or based on user input, that indicates whether the automated service agent 104 and/or the generated contact workflow that the agent 104 executes are fulfilling customer expectations. Feedback validating the workflow states may be generated in response to the performance of an automated action, as well as in response to favorable responsive input from the customer after the action is performed. In contrast, if an automated action fails or is aborted or canceled, or if the customer invokes a transition to a human agent or exhibits certain sentiment in the natural language input, negative feedback may be generated. The feedback may be stored as contact center data 150, or may be sent directly to the automated service agent engine 128, which may incorporate the feedback into the data model(s) using the machine learning engine/data modeling algorithms. For example, the machine learning engine may be retrained using the feedback to improve the thresholds or other aspects of the data model. The system 114 may make automated service agents and generated contact workflows available to the users, such as by providing an API to the automated service agent system 128.

The present systems and methods for generating automated service agents to execute detected workflows in a contact center can be used in computer systems 105 upon which the computing resource service provider implements the virtualized computing environment 101. The physical (i.e., hardware) computing systems 105 may be co-located in one or more data centers or may be remote from each other, and may be interconnected via various networking devices and one or more physical networks. The physical computing systems 105 and other devices are used in this example by a network service to enable administrative users to arrange one or more contact centers 103 and provide contact center services to collaborative users. Services and resources of the computing environment 101 can be implemented on virtual networks that use the physical network(s) as a substrate network upon which the virtual networks are overlaid. The computing environment 101 may include the contact center system 114 and various virtual computing resources that support the system 114, such as logical data storage devices virtualizing physical storage volumes and memory modules, virtual network interfaces, load balancers, services (e.g., notification service 168, external communication manager 138), and the like, all interconnected with virtual private networks.

In some embodiments, computing devices 190, 196 of the users of the contact center system 114 can access computing resources and services of the computing environment 101, including the contact center system 114, over an external (i.e., outside of the computing environment 101) communication network 106. In some embodiments, communication network 106 can be any suitable wired network, wireless network, any other suitable network, or any suitable combination thereof. Additionally, communication network 106 can be any suitable personal area network, local area network, wide area network, over-the-air broadcast network (e.g., for radio or television), cable network, satellite network, cellular telephone network, any other suitable type of network, or any suitable combination thereof. For example, communication network 106 can be a publicly accessible network of linked networks, in some cases operated by various distinct parties, such as the Internet. In some embodiments, communication network 106 can be a private or semi-private network, such as a corporate or university intranet. Additionally, in some embodiments, communication network 106 can include one or more wireless networks, such as a Global System for Mobile Communications ("GSM") network, a Code Division Multiple Access ("CDMA") network, a Long Term Evolution ("LTE") network, any other suitable wireless network, or any suitable combination of wireless networks. Communication network 106 can use any suitable protocols and/or components for communicating via the Internet and/or any of the other aforementioned types of networks. For example, communication network 106 can use one or more protocols or combinations of protocols, such as Hypertext Transfer Protocol ("HTTP"), HTTPS, Message Queue Telemetry Transport ("MQTT"), Constrained Application Protocol ("CoAP"), etc.

The computing environment 101 may include an external communication manager 138 that manages external communications that enter and leave environment 101. In some embodiments, the external communication manager 138 may translate network activity between the address spaces of the computing environment's 101 virtual networks and the address space of the external communication network 106. Alternatively, the external communication manager 138 may be a simple router configured to pass data transmissions from source to destination. In some embodiments, the external communication manager 138 may provide various APIs, including a console and/or user interfaces for the collaborative users and administrative users, to disparate computing devices 110, 130. The external communication manager 138 may obtain the APIs from the frontend 118.

In some embodiments, the contact center system 114 may include a frontend 118 to receive and process messages from the computing devices 190, 196 of authorized users of the system 114. For example, in some embodiments, frontend 118 can serve as a "front door" to the subsystems of the contact center system 114. Frontend 118 can process the messages received from various computing devices and/or generated, for example, in response to events (e.g., when a user submits user input for calling an API to perform an action), and can determine whether the messages are properly authorized. In some embodiments, frontend 118 can include one or more web servers configured to expose one or more application program interfaces ("APIs") that can receive messages from one or more computing devices 190, 196 as API calls. In some embodiments, frontend 118 can extract requests from the API call and write them to a data store associated with the contact center system 114. In one example, a user agent using computing device 196 may call an API of a user customer relationship management (CRM) system 192 to access customer data 194 (e.g., a purchase history of a customer 108) and/or business data 195 (e.g., a product catalog, inventory, or purchase order database). The messages and user input received by the frontend 118 from administrative users may be processed by the frontend 118 or another service configured to perform administrative functions; changes to user accounts and settings, and associations of contact centers to their respective user accounts, may be stored in the user data store 122.

Figure 2:
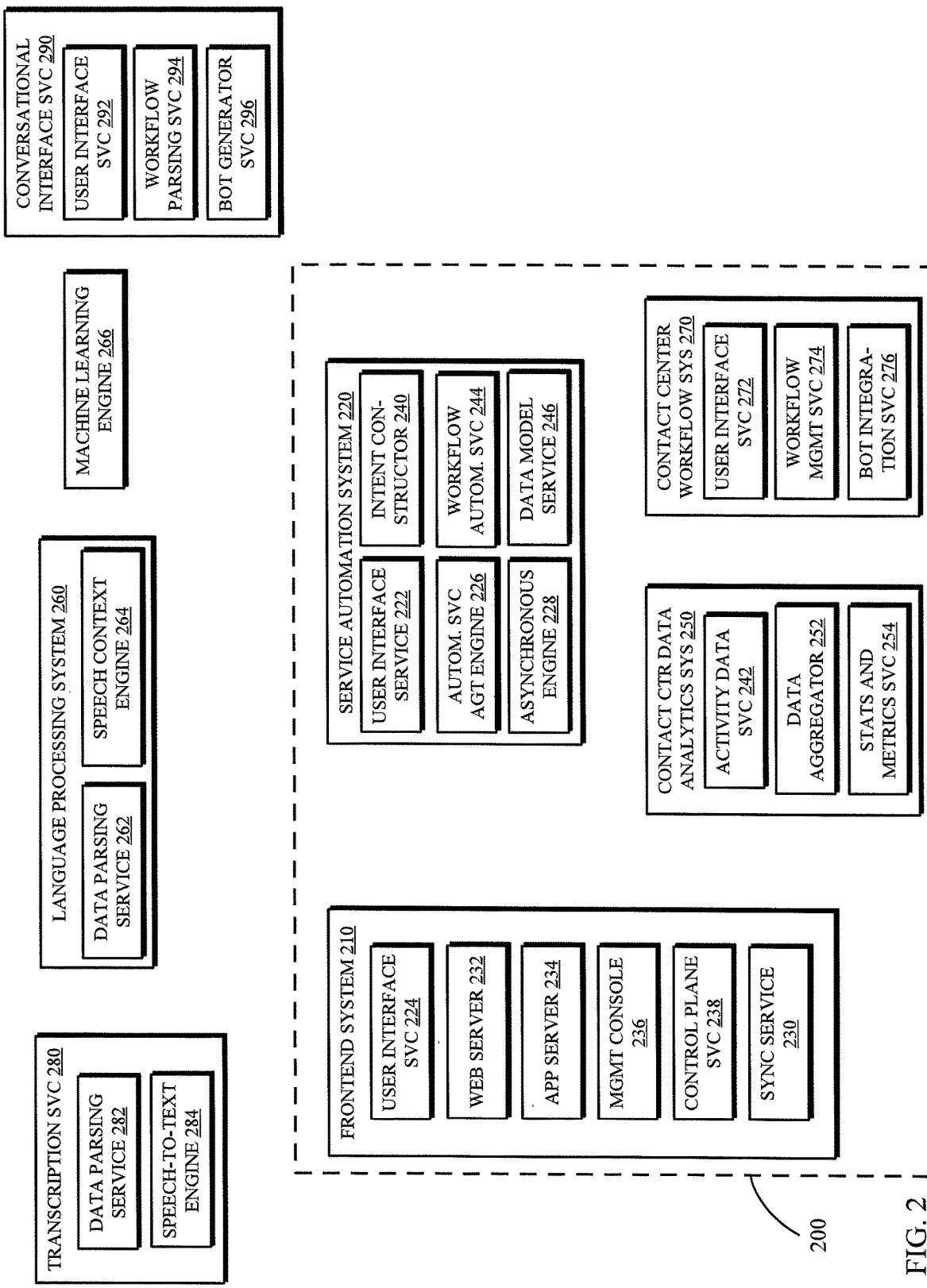
FIG. 2 is a diagram of an example computer system that may be used to practice at least one embodiment of the present disclosure.

FIG. 2 illustrates an example service architecture of a contact center system 200 as described above, including the functional entities of the front-end system 210, the service automation system 220, the contact center data analytics system 250, and the language processing system 260, in accordance with at least one embodiment. The front-end system 210 can include a user interface service 224, a web server 232, an application server 234, a management console 236, a control plane service 238, and a synchronization service 230. The user interface service 224 may be a collection of computing devices and other resources collectively configured to generate any of the user interfaces and their composite screens, including static and dynamic graphical elements and interactive elements that enable a user to enter user input, that are displayed on the display screens of user computing devices. Non-limiting examples of user interface elements include: interface and contact center navigation elements; visual representations of contact center activity and workflow management; control screens for performing contact center interactions such as servicing a customer contact, managing automated tasks and interactions set by the system 220, and managing file storage arrangements such as directory structures; and, control screens for performing other interactions, such as managing site and/or user account settings, and accessing contact center data. The user interface service 224 may send data representing the user interfaces to the user computing devices for display thereon, through any of the suitable servers 232, 234.

The web server 232 may enable the execution of a web site, a single-page web application or a single-page interface that permits a user to access the contact center system 200. The web server 232 may further serve as a user device client. The web server 232 may also enable an administrative user to set permissions or share modes that specify the privileges given to a user agent in accessing the contact center system. In addition, the web server may enable users or devices to submit authentication credentials. Although one web server 232 is described with reference to FIG. 2 it may be contemplated that multiple web servers of any type may be used, whereby a portion of the web servers may be redundant.

The application server 234 may be a collection of computing devices and other resources collectively configured to serve as a user-exposed service that receives requests from the user and services the requests. A user request may be made using a website or a management console accessible to the user or a client that is executed on a user's device and may make service requests on behalf of the user. The request may be an API function call and the application server 234 may process the request and manage its execution. The application server 234 may process web-based API function calls as well as calls to non-HTTP APIs, such as mobile software application APIs and other software APIs. For example, some user agents may connect to the contact center system 200 using a plugin or similar software application that cooperates with one or more local applications installed on the user computing device, such as a word processing program, an email client, a personal scheduling program, and the like. The application server 234 may cause the synchronous execution of actions associated with a received request or alternatively may cause one or more actions that require more complex processing to be queued and/or sent to another system (e.g., service automation system 220) for asynchronous execution. The application server 234 may also be responsible for receiving user credentials and request authentication of the user from an authentication service.

The management console 236 may be a collection of computing devices and other resources collectively configured to permit organizations, administrators and users to register for utilizing the service automation system 220. The management console 236 may be used in addition or as an alternative to a website or an application running on a user device and may permit users and administrators to make service requests using appropriately configured API function calls. For example, the management console 236 may be used for allowing dashboard access, audit log access, permission setting (for example, for administrators and users), storage limit setting (for example, for organizations and users) and security setting (for example, password and encryption). The control plane service 238 of the frontend system 210 may be a collection of computing devices and other resources collectively configured to serve as an interface to services and other resources of the computing resource service provider outside of the contact center system 200 (e.g., notification, message relay, machine learning, data monitoring/logging, and data storage services). The control plane service 238 may send messages to, and receive messages from, such services, may store and retrieve data from storage locations, etc.; such transmissions may be performed using secure channels, and/or may include authentication procedures to verify such transmissions. For example, the control plane service 238 may coordinate with the control plane service(s) of other computing resource service provider service architecture to provide communication channels and protocols between the subsystems of the contact center system 200 and the language processing system 260, machine learning engine 266, transcription service 280, and conversational interface service 290.

The synchronization service 230 of the front-end system 210 may be a collection of computing devices and other resources collectively configured to provide information to users nearly contemporaneously with the generation of the information. The synchronization service 230 may communicate with one or more services of the service automation system 220 in order to provide information to one or more users. The synchronization service 230 may implement a WebSocket or other protocol to enable users of the service automation system 220 to receive updates to contact center data. The synchronization service 230 may provide a bi-directional communications channel between single- or multi-page web application or client application operated by the user and the web server 232 or one or more other services of the service automation system 220. For example, multiple user agents may be available within a contact center, possibly using different communication channels (e.g., desktop/web, application, phone) to service customer contacts; the synchronization service 230 may receive updates to the service tasks/workflow corresponding to users' interaction through the particular user's client application. The synchronization service 230 may the transmit information corresponding to the users' interaction to one or more of the multiple users logged into the contact center simultaneously, and/or to other users authorized to access the contact center, such that the users receive real-time updates to intent workflows, etc.

In some embodiments, the service automation system 220 can include some or all of a user interface service 222, an automated service agent engine 226, an asynchronous engine 228, an intent constructor 240, a workflow automation service 244, and a data model service 246. In other embodiments, various other systems 210, 250, 260 of the contact center system may implement any of the listed services. The user interface service 222 may be a collection of computing devices and other resources collectively configured to generate any of the user interfaces and their composite screens, including static and dynamic graphical elements and interactive elements that enable a user to enter user input, that are displayed on the display screens of user computing devices. Non-limiting examples of user interface elements include those described above, as well as interfaces for confirming or changing details of intents constructed by the intent constructor 240, interfaces for manually creating or changing workflows or modifying settings that control workflow generation within a workflow automation service 244, and interfaces for confirming, modifying, deploying, and otherwise managing automated serve agents produced by the automated service agent engine 226, etc. The user interface service 222 may send data representing the user interfaces to the frontend system 210 for delivery to user computing devices (i.e., by the appropriate server(s) 232, 234).

The automated service agent engine 226 may be a collection of computing devices and other resources collectively configured to obtain and analyze, and/or coordinate other systems and services to analyze, activity data and other data as described above to discover customer intents and service agent actions, generate contact workflows that use the actions to satisfy the intents when presented in a customer contact, and generate automated service agents that can be deployed into a contact center to autonomously detect an intent in a customer input and execute the contact workflow. In one example, the automated service agent engine 226 may obtain an aggregate data set from the data analytics system 250, obtain transcripts of the recorded contacts in the data set from the transcription service 280, obtain data describing customer sentiment and other context of a contact from the language processing system 260, invoke the intent constructor 240 to evaluate (e.g., using a data model service 246 and/or machine learning engine 266) the transcribed, contextualized activity data and discover one or more intents, along with the intent attributes and one or more actions that the service agent can perform in response to the customer expressing the intent, invoke the workflow automation service 244 to translate the intent records into a sequence of workflow states interconnected to form a contact workflow for the intent, and invoke a conversational interface service 290 to generate an automated service agent and an agent configuration for autonomously executing the contact workflow and interacting, in a humanlike manner, with a customer expressing the intent.

The asynchronous engine 228 may be a collection of computing devices and other resources collectively configured to manage the execution of asynchronous workflows. The asynchronous engine 228 may include or be connected to a queue that stores asynchronous events for execution; the asynchronous events may each correspond to performance of an action, and one or more events may need to execute for each interaction. The asynchronous engine 228 may coordinate the execution of asynchronous workflows with various services of the system 220 and may be responsible for scheduling execution of actions associated with the workflow. The asynchronous engine 228 may process events for submitted interactions in sequence at times, but also in accordance with event interdependencies and with resource availability. In some embodiments, the asynchronous engine 228 may cooperate with the activity data service 242 to generate activity data representing some or all of the interactions on the system 220. For example, the asynchronous engine 226 may send, automatically or in response to a request from the activity data service 242, information about each completed event, and/or about a completed interaction comprising a plurality of events, to the activity data service 242 for storage and/or other processing.

The intent constructor 240 may be a collection of computing devices and other resources collectively configured to analyze service agent-customer interactions and other data and identify intents, associated intent attributes, and associated possible actions and their corresponding APIs. The intent constructor 240 may produce one or more intent records describing the intents discovered in the recorded data for a given contact. The intent records may be data structures containing the identified data in a format that other services, such as the autonomous service agent engine 226 and the workflow automation service 244, are able to process in order to produce workflows and automated service agents. In some embodiments, an intent record may include fields that: identify the intent, such as with a unique intent identifier (e.g., ID number); describe the intent in natural language a human agent or administrator would understand (e.g., an intent to issue a refund may include a descriptor field with the value "Issue Refund"); identify one or more utterances associated with the intent, detectable in the customer's natural language input, and representing phrases the customer could (or did) say to express the intent—the data in an "utterances" field could include multiple records each comprising an audio recording of an associated utterance or a transcription of the utterance; identify one or more classes or categories of the intent; identify one or more attributes of the intent, such as with a sub-structure for each attribute that includes an attribute identifier, a flag indicating whether a value for the attribute is required, a data format of the attribute input value, one or more fields storing utterances associated with the attribute, etc.; and, identify one or more actions to be performed in association with the intent, such as with a sub-structure for each action that includes an action identifier, one or more APIs to call to perform the action, credentials (if any) needed to call the one or more APIs, etc. The intent constructor 240 may access other systems and services, such as a transcription service 280, language processing system 260, and machine learning engine 266, to analyze recorded activity and other data. In some embodiments, information about an intent may be gathered, analyzed, and stored by such other systems and services, and an intent record created by the intent constructor 240 may include references to this information instead of the information itself. For example, a language processing system 260 or a conversational interface service 290 may identify utterances and create and store utterance records, and the intent constructor 240 may create the intent record to include references to the utterance records associated with the identified intent. Example implementations of the intent constructor 240 are described in detail below with respect to FIG. 4.

The workflow automation service 244 may be a collection of computing devices and other resources collectively configured to analyze intent records generated by the intent constructor 240 and predictive data generated by the automated service agent engine 226 to create workflow states and interconnect them to produce contact workflows. In some embodiments, the workflow automation service 244 associates predictive actions with workflow states based on behavior patterns within interactions; the behavior patterns may be detectable from the activity data generated by the activity data service 242, and may pertain to interactions and other functions that the relevant user(s) has/have been performing "manually"—that is, without the aid of workflow automation. There may be multiple types of predictive actions. In some embodiments, a predictive action may be an automated interaction, an alert notifying the user of expected behavior, a notification containing one or more recommendations to the user to perform certain actions (e.g., change security settings for an API), a monitoring action that monitors future activity for expected behavior, or a combination thereof. For example, a predictive action may be a notification recommending that the user allow the system to deploy a generated automated service agent to handle contacts associated with a particular intent, including a selectable element to accept the recommendation; the workflow automation system 244 may deploy the automated service agent in response to the user's acceptance of the recommendation.

The intent constructor 240 and/or workflow automation system 244 may identify predictive actions using one or more predetermined or user-provided thresholds associated with the values of one or more metrics that define the behavior patterns. In some embodiments, there may be a known set of metrics determined by the data modeling algorithm(s) that the data model service 246 is configured to apply to aggregated activity data. Some predictive actions may be based on a single metric. For example, the predictive data may include a metric identifying the relative frequency of each API call or sequence of API calls that is made by the service agent immediately following the customer's expression of the intent. A predictive action operating on just this metric may cause the intent constructor 240 to identify each API called at a frequency that is above a certain threshold, which may be preset or based on a median frequency or another measure of relative frequency, as a possible action validly taken when the customer expresses the intent; this predictive action may further cause the workflow automation system 244 to generate a workflow state for each of the identified APIs. Other predictive actions may be based on multiple metrics, evaluated serially or in parallel.

The data model service 246 may be a collection of computing devices and other resources collectively configured to generate or obtain data models representing measured characteristics identifiable across sets of similar customer contacts. The data models generated by the data model service 246 may be used to automatically generate contact workflows and automated service agents as described herein. For example, a data model may include one or more intents and a feature set associated with each intent, wherein data elements of the feature set include intent attributes and service agent actions. Each data element may have an associated value or a plurality or range of potential values; in some embodiments, the potential values may be derived from a training set of recorded previous contacts.

In some embodiments, the contact center data analytics system 250 can include an activity data service 242, a data aggregator 252, and a statistics and metrics service 254, and other services. The activity data service 242 may be a collection of computing devices and other resources collectively configured to generate interaction records describing some or all of the activity performed by users and automated service agents on the contact center system 200.

The data aggregator 252 may be a collection of computing devices and other resources collectively configured to obtain and aggregate activity data and send the aggregated activity data to the service automation system 220. The data aggregator 252 can collect and compile various combinations of activity data pertaining to one or more user agents, one or more automated service agents, one or more users, one or more intent/activity types, or any combination thereof, across any duration or period of time of interest. Any data aggregation method suitable for summarizing activity data records produced by the activity data service 242 may be used, and one or more aggregated data sets may be produced. The statistics and metrics service 254 may control the manner in which the data aggregator 252 compiles the obtained activity data to produce the data set(s). Non-limiting examples of aggregation parameters that may be set include: aggregation frequency; whether a rolling window is used, and the duration of the window; data sets to produce, such as a single aggregated data set comprising all of the recorded activity data occurring during the time period of interest, or context-specific aggregated data sets each containing only the activity relevant to a particular user or group of users, or to a particular customer or set of customers, or to a particular type of intent/action, or to a particular time period; and, parameters within the activity data to include or exclude.

In some embodiments, the contact center workflow system 270 can include a user interface service 272, a workflow management service 274, and an automated service agent integration service 276. The user interface service 272 may be a collection of computing devices and other resources collectively configured to generate any of the user interfaces and their composite screens, including static and dynamic graphical elements and interactive elements that enable a user to enter user input, that are displayed on the display screens of user computing devices. Non-limiting examples of user interface elements include those described above, as well as interfaces for manually creating or changing contact workflows using the workflow management service 274. The user interface service 222 may send data representing the user interfaces to the frontend system 210 for delivery to user computing devices (i.e., by the appropriate server(s) 232, 234).

The workflow management service 274 may be a collection of computing devices and other resources collectively configured to generate, modify, store, and deploy contact workflows as described herein. The workflow management service 274 may generate the data used by the user interface service 272 to provide a design environment for display on a computing device; the design environment enables a user of the computing device to visually create and edit workflow states and interconnect them to produce a contact workflow. In some embodiments, the user can add workflow states to a contact workflow that invoke automated service agents to perform a portion of the workflow. The automated service agent integration service 276 may be a collection of computing devices and other resources collectively configured to incorporate automated service agents into a contact center in order to execute contact workflows, as described herein. In some embodiments, the automated service agent integration service 276 may enable deployment of automated service agents that are manually created (e.g., using the workflow management service 274 and conversational interface service 290) or automatically created (e.g., using the service automation system 220).

In some embodiments, the language processing system 260 can include a data parsing service 262 and speech context engine 264, and other services. The data parsing service 262 may be a collection of computing devices and other resources collectively configured to parse data structures of the aggregated activity data to obtain a set of parameters to analyze, and their respective values and/or associated interaction records. In some embodiments, the set of parameters may be target parameters of a preconfigured data modeling algorithm executed by the speech context engine 264 and/or a machine learning engine 266. In other embodiments, the set of parameters may include only those parameters that are relevant to the predictive actions that the intent constructor 240 and/or workflow automation service 244 is configured to identify. In other embodiments, the set of parameters may include only those parameters that have new information to process since the previous predictive analysis of aggregated activity data. In other embodiments, the set of parameters may be all parameters that can be extracted from the aggregated activity data.

The data parsing service 262 may generate one or more data structures each containing the information related to one or more of the set of relevant parameters, and each configured according to a format that the speech context engine 264 and/or machine learning engine 266 is configured to process. In some embodiments, the data parsing service 262 may be a language-oriented parser, such as a JSON parser that obtains parameters and their values from structured or unstructured data.

The speech context engine 264 and/or machine learning engine 266 may be trained, using supervised or unsupervised learning, to produce metrics describing the behavior patterns and defined by the parsed parameters. Some metrics may pertain to user-based patterns, and the relevant parameters recorded in interaction records may include identifiers of users that were subjects of interactions performed by a target user, or that performed interactions identifying the target user, or that performed interactions on customer contacts assigned to the target user. Some metrics may pertain to time-based patterns, and the relevant parameters recorded in interaction records may include a timestamp indicating the time of day, day of the week, day of the month, and the like; additionally, relevant parameters may comprise calculated durations between interactions and other events, such as the time elapsed between a request and an acceptance of the request, or between calls to an API that is not returning expected data. Some metrics may pertain to activity-based patterns, and the relevant parameters recorded in interaction records may include the type of interaction, and the use of optional parameters for certain activities (e.g., whether different values for an optional intent attribute cause different actions to be performed). In some embodiments, any of the metrics may further include the parameters of interaction records that describe feedback to previously identified predictive actions, as described above, so that the machine learning engine 266 may account for the feedback and further refine the resulting predictive data.

In some embodiments, the machine learning engine 266 may perform any suitable machine learning and/or other data modeling process(es) to metrics in the parsed data to produce predictive data describing the behavior patterns in the respective activity. The machine learning engine 266 may include the learning algorithms along with their settings, or the engine 266 may cooperate with another machine learning service, which may be provided by the computing resource service provider as described above, or may be external to the provider's virtual computing environment. The machine learning engine 266 may be configured to search for deeper differentiation based on metrics identifying a pattern within an identified pattern. The resulting predictive data may describe or represent one or more data models of the available sets of aggregate activity data. The data models may use a model contact workflow as a reference, to which the data models associate the analyzed metrics. A data model may include identification of tasks and/or interactions that establish and/or execute the contact workflow; some of these tasks and/or interactions may be anticipated once a certain point in the workflow is reached, and/or in response to the presence of certain conditions in the system. When new aggregated activity data or other user information relevant to the data model(s) is available, the system may re-apply the data modeling technique(s) to integrate the new data into the predictive data and update the corresponding data model(s). Any generated predictive data may be sent to the service automation system 220 for processing into predictive actions as described above.

The service automation system 220 and/or other subsystems of the contact center system 200 may interface with other services of the computing resource service provider; non-limiting examples of such services include a transcription service 280 and a conversational interface service 290. The automated service engine 226 and/or the intent constructor 240, as described above, may send recordings of natural language inputs to the transcription service 280. A data parsing service 282 of the transcription service 280 may analyze the natural language inputs and any associated metadata to restructure the data; for example, the data parsing service 282 may receive an input file comprising an audio recording, and may divide the input file into a plurality of file segments by detecting different voices in the audio recording and separating the input file into segments assigned to each corresponding speaker. A speech-to-text engine 284 may apply one or more speech recognition algorithms to the natural language input(s) and/or the corresponding parsed data to produce a text transcription of the recorded conversation. The text transcription may be sent back to the service automation system 220.

A conversational interface service 290 may be configured to produce interactive "chatbots," or automated agents that can comprehend and respond to user input in a conversational manner. In some embodiments, a user interface 292 is provided to enable users of the computing resource service provider to create and configure automated agents by manually entering user input. The conversational interface service 290 may include a workflow parsing service 294 configured to understand the formatting of contact workflows used in the contact center service 200, and further to produce automated agents that can execute the contact workflows. Alternatively, the service automation system 220 (e.g., the automated service agent engine 226 or the workflow automation service 244) may convert contact workflow data into conversational workflow data that the workflow parsing service 294 understands, and from which an agent generator 296 may generate automated agents. Automated agents generated for the purpose of executing contact workflows may be sent back to the service automation system 220.

Figure 3:
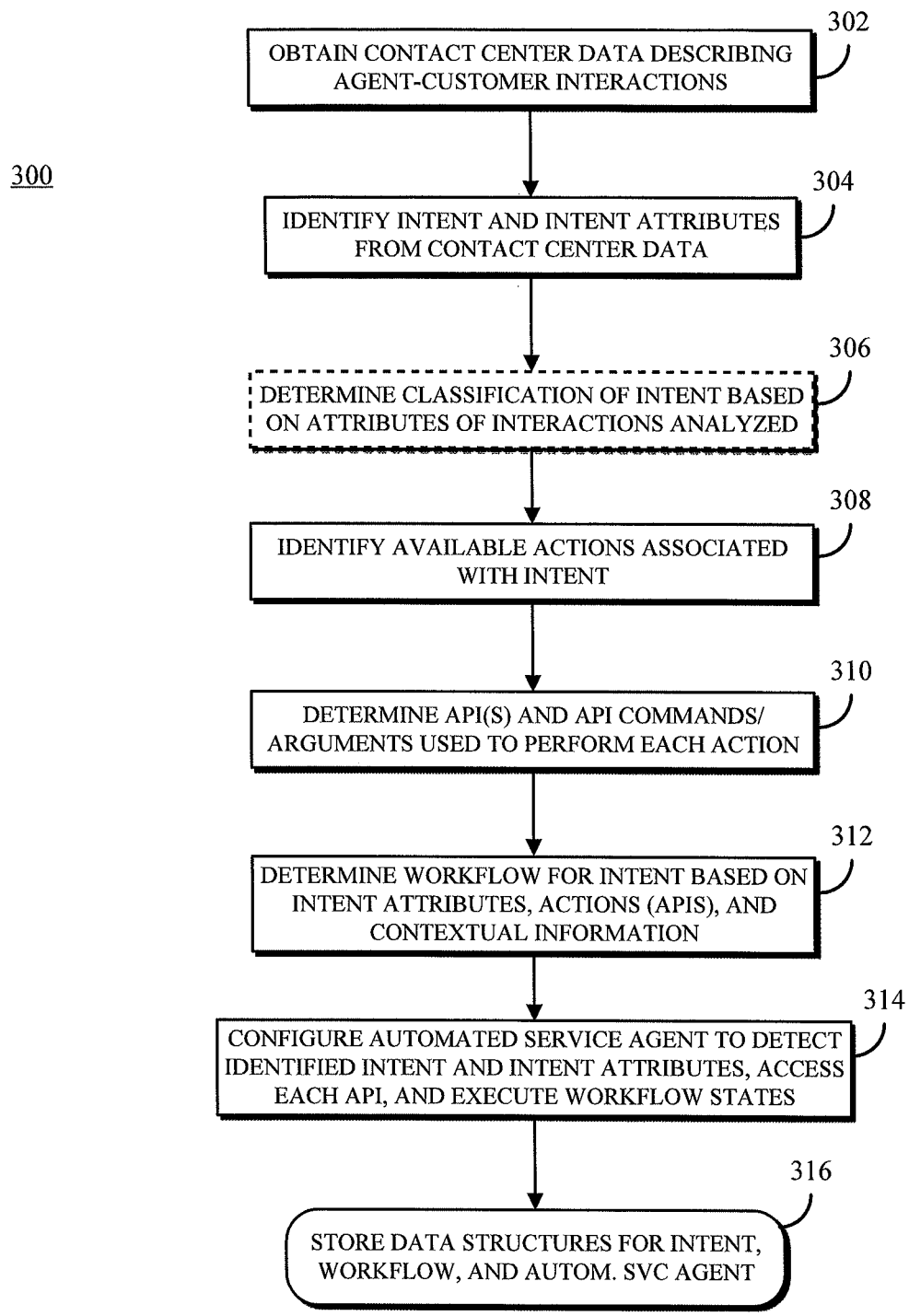
FIG. 3 is a flowchart of an example method for automating identification of a customer intent, service agent actions that respond to the intent, and a workflow for a computerized service agent to apply when serving a customer contact having the intent.

FIG. 3 illustrates an example method 300 performed by the contact center system to identify intents of customers and actions that agents take in response, generate workflows embodying the intents and actions, and configure automated service agents to execute the workflows and automate portions of the workflow that were previously executed through manual user interactions. At 302, the system may obtain contact center data describing agent-customer interactions, such as recorded calls, network activity logs showing API calls, and other recorded activity.

At 304, the system may identify at least one intent and its corresponding intent attributes using the contact center data. In some embodiments, at least one of the identified intents may be already known to the system. For example, the intent may be associated with an intent record stored in the user's contact center data (e.g., in intents and actions 126 as described above with respect to FIG. 1) and/or stored in a systemwide data store for use by other users (e.g., all users, as in a global, default, or standard set of intents; or, a subset of users, such as the subset of users that are corporate entities in the same industry) in their contact workflows. In some embodiments, at least one of the identified intents may have been previously unknown to the system—entirely unknown in some cases, and at least unknown to the contact center service as implemented for the current user.

At 306, in some embodiments the system may determine a category or classification of the intent, based at least in part on the intent attributes and other properties of the interactions that are analyzed as part of the contact center data. A classification scheme may include classes that are defined by the attributes of the contact that can be determined from the data describing the interactions, using speech-to-text transcription and natural language processing and other machine learning techniques, as described above. In some embodiments, intents may be classified based on attributes describing a context of the customer making the contact; non-limiting examples of such attributes include issue/problem type, customer profile data, recent purchase history, etc. In some embodiments, intents may be classified based on attributes describing a context of the service agent; non-limiting examples of such attributes include agent performance history, agent previous interactions with customer, agent training level with the system, and agent abilities/skill level with respect to customer service generally and the identified intent specifically. The system may further classify the intent attributes themselves.

Classifying an intent may be optional; in embodiments where the system does classify intents, the classification(s) may be used to leverage information about an intent, such as a newly discovered intent, for use in the contact centers of other users of the computing resource service provider. For example, the activity data being analyzed may describe a set of interactions on a first user's contact center; the system may, upon identifying the intent, obtain information about properties of the first user's business, such as the industry of the business, and may create and store a classification for the intent that identifies the intent as relevant to the properties. The system may store the corresponding intent record in a data store of public or semi-public intent records. The intent may then be used in contact centers of other users operating businesses that have the same properties. For example, when a second user's business is in the same industry as the first user's business, the corresponding intent may be exposed to manual or automated contact workflow and service agent creation, as a relevant intent to the second user's customers.

At 308, the system may identify the available actions associated with the intent—i.e., the service agent action(s) performed when the customer expresses the present intent. At 310, the system may determine the API(s) that the service agent calls, and the API commands/arguments used, to perform each action. In some embodiments, at least one of the actions may be already known to the system, and thus the system is configured to identify the corresponding API calls in the activity data. For example, the action may be associated with an intent record stored in the user's contact center data (e.g., in intents and actions 126 as described above with respect to FIG. 1) and/or stored in a systemwide data store for use by other users (e.g., all users, as in a global, default, or standard set of intents; or, a subset of users, such as the subset of users that are corporate entities in the same industry) in their contact workflows. In some embodiments, at least one of the actions may have been previously unknown to the system—entirely unknown in some cases, and at least unknown to the contact center service as implemented for the current user. API calls may be to known APIs that are specific to the contact center system (i.e., used to execute functions of various components of the system), or may be to APIs associated with other services of the computing resource service provider, or may be to APIs of other systems, like a user CRM.

At 312, the system may design one or more contact workflows for the intent, based on intent attributes, actions (APIs), and contextual information. In some embodiments, the contact workflows may be created and stored in a workflow format that is used in the contact center system, i.e., for guiding human agent and manually-created automated agent interactions. At 314, the system may configure at least one automated service agent to detect the identified intent(s) and corresponding intent attributes in a customer's natural language input, to access each API and otherwise perform the available action(s), and to execute workflow states in the generated contact workflow(s). At 316, the system may store all of the generated data structures, such as an intent record, contact workflow, and automated service agent template, and any associated data in appropriate data storage locations.

Figure 4:
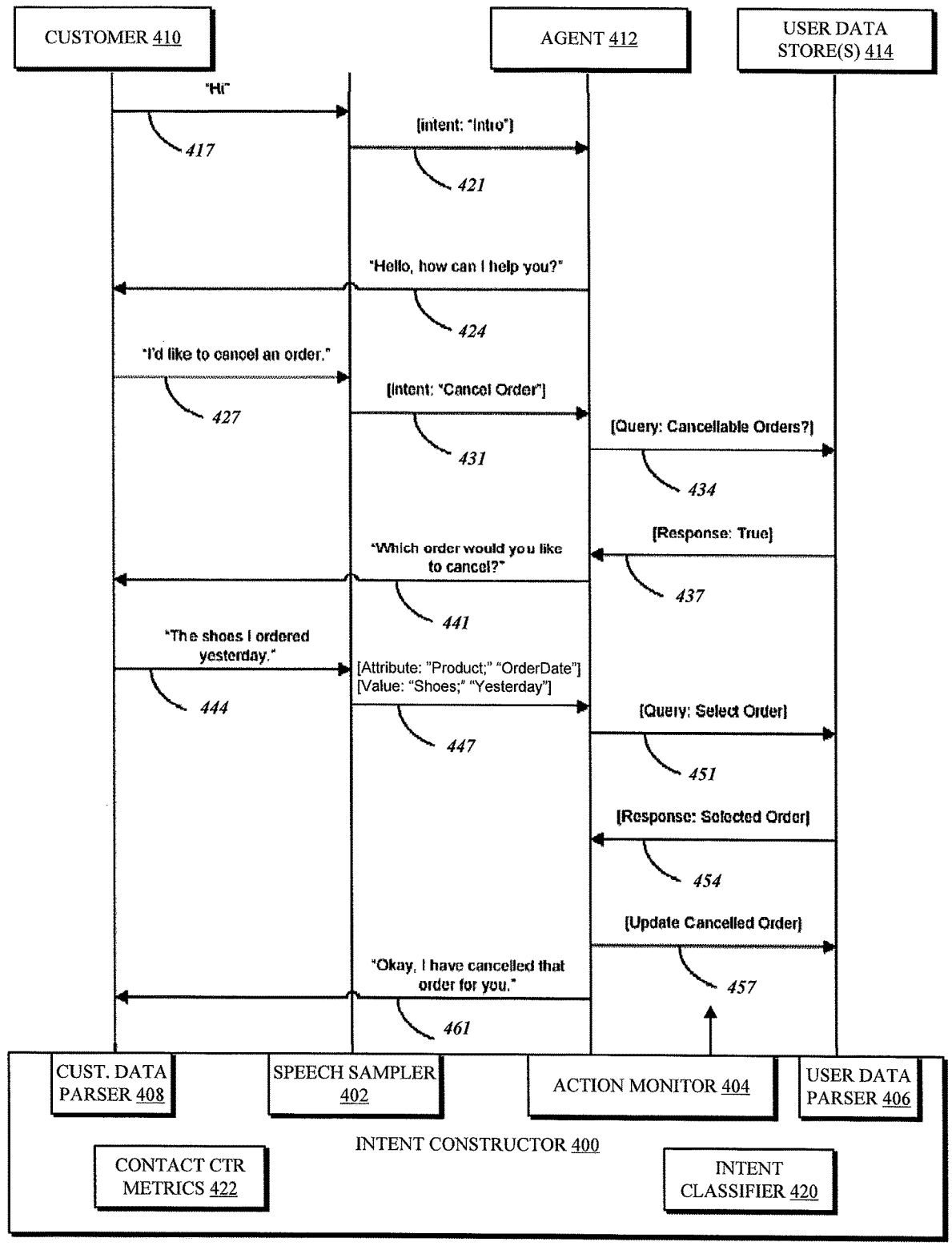
FIG. 4 is a diagram of an example embodiment of an intent constructor automatically identifying intents, intent attributes, and actions from recorded interactions and other contact center data.

FIG. 4 illustrates an example intent constructor 400 processing activity data representing a recorded contact between a customer 410 and an agent 412, which may be a live or automated service agent, on a contact center as described herein. The example intent constructor 400 includes a speech sampler 402, an action monitor 404, a user data parser 406, a customer data parser 408, and other analytics services and data such as an intent classifier 420 and contact center metrics 422. The intent constructor 400 and/or any of its components may collect and analyze data and/or may communicate with other services, such as a natural language processing system, to analyze collected data.

The speech sampler 402 detects utterances in natural language input by either the customer 410 or the agent 412. The speech sampler 402 may operate on audio data or on a transcription (i.e., text) of the recorded contact. The intent constructor 400 may identify intents and intent attributes, and their associated information, from speech analyzed by the speech sampler 402. The action monitor 404 detects agent 412 actions from the activity data, including API calls and the arguments used in the API call, other data access and modification operations, data returned from data stores in response to agent 412 actions, notes and correspondence generated by the agent 412 or another party associated with the contact (e.g., the agent's supervisor), etc. The intent constructor 400 may identify actions performed in associated with an identified intent, and may generate action data structures in the intent record accordingly.

Action identification may be assisted by the user data parser 406 and the customer data parser 408. The user data parser 406 may be configured to detect data returned to the contact center from one or more user data stores 414 in response to agent 412 actions. For example, the agent 412 may submit an API call or database query to a knowledge base storing information about the user's products, or to a user data store 414 (e.g., in the user's CRM) containing the user's customers' orders and other account data. The user data parser 406 may identify data elements, structures, formats, etc., in the user data that the intent constructor 400 may use to determine a simulation of the agent 412 actions. Similarly, the customer data parser 408 may be configured to collect data related to the customer, such as the method of contacting the contact center (e.g., phone call, live chat on website, click-through from website, emailed service request), a history of past contacts, whether the customer requested a live agent, etc. The intent constructor 400 may access contact center metrics 422 (e.g., generated and stored by contact center subsystems as described above) to improve the accuracy of identifying intents, intent attributes, and actions. In some embodiments, the contact being analyzed by the intent constructor 400 may be a live contact between a customer 410 and an "experimental" automated service agent 412 designed to identify intents and actions and automated contact workflows from scratch, as described further below. In the example communication, reference 417 depicts a natural language input "Hi" from the customer 410 to the agent 412. The speech sampler 402 detects an intent of "Intro" at reference 421, indicating that the customer 410 wishes to perform a subsequent action. The agent 412 then communicates a response of "Hello, how can I help you?" at reference 424. The speech sampler 402 detects this response as a prompt to the customer to input the customer's next intent. The customer 410 in response to the prompt provides a natural language input of "I'd like to cancel an order" to the agent 412 at reference 427. The speech sampler 402 detects an intent of "Cancel Order," and may attempt to identify the intent in an intent database at reference 431. If there is no matching intent, the intent constructor 400 may begin building an intent record for the "Cancel Order" intent.

At reference 434, the action monitor 404 detects that, in response to the "Cancel Order" intent, the agent 412 queries the user data store 414 to determine if there are any cancelable orders for the customer 410. For example, the action monitor 404 may detect an API call to the external CRM and may obtain the details of the API call. The action may be a "getCancelableOrders" API call including, the customer's identifying information as an argument). The intent constructor 400 may attempt to match the collected information to a known action, and may create an action record for the identified action and associate the action record with the intent record. At reference 437, the action monitor 404 determines that the agent 412 receives an indication (i.e., from the user CRM or another service of the computing resource service provider) that there are cancelable orders associated with the identified customer. The agent 412 then provides a response to the customer 410 at reference 441, soliciting an indication of which order should be cancelled. The speech sampler 402 may detect this as a prompt, and/or the action monitor 404 may detect this as an action associated with obtaining values for required intent attributes to perform the actions that satisfy the "Cancel Order" intent.

In response to this prompt, at reference 444 the customer 410 communicates a natural language input of "The shoes I ordered yesterday" to the agent 412, which identifies entities "Shoes" and "Yesterday." The speech sampler 402 detects this input as one or more values for intent attributes. In some embodiments, at this point the intent attributes are unknown; the intent constructor 400 may at reference 447 apply automated logical reasoning to determine the context of the values. For example, the intent constructor 400 may determine that an order must be identified to be canceled, and the user data store 414 maintains a set of parameters for each order including the order number; order date, products in the order, etc.; the user data store 414 may also maintain a set of parameters for each product, including product identifier, category, manufacturer, model number, price, etc. Based on the available parameters, the intent constructor 400 may determine that the values are associated with certain intent attributes. For example, the intent constructor 400 may access a knowledge base associated with the user or with a business category that the user's business belongs to, and may determine that "shoes" are a product category, the intent constructor 400 may use semantic reasoning or context data to determine that "yesterday" is associated with a specific date and is likely an order date associated with the order to be canceled.

The action monitor 404 determines that the agent 412 queries the data store 414 for a corresponding order at reference 451. For example, the action monitor 404 may detect that the agent 412 called a. "selectOrder" API with the customer identifier, the order date, and a keyword associated with ordered products as arguments. The intent constructor 400 may attempt to match the collected information to a known action, and may create an action record for the identified action and associate the action record with the intent record. In some embodiments, the intent constructor 400 may further store information (e.g., in the intent record or the action record) indicating that the agent 412 expected that the customer ID and the values for intent attributes "orderDate" and "productKeyword" (or "productCategory" or "orderDetails," etc.) constituted sufficient information to identify one or more orders in the customer's order history stored in the user data stores 414. At reference 454, the action monitor 404 determines that the agent 412 receives (i.e., from the user CRM or another service of the computing resource service provider) the order(s) matching the query terms. In the illustrated example, an identifier of the exactly one matching order is returned; in other embodiments, the query may return zero matching orders or multiple matching orders, and the agent 412 will perform other actions to satisfy the intent, as illustrated in FIG. 6.

The action monitor 404 determines that the agent 412, having access to the selected order, initiates an order cancellation action at reference 457. For example, the action monitor 404 may detect that the agent 412 called a "cancelOrder" API with at least the order identifier returned at 454 as an argument. The intent constructor 400 may attempt to match the collected information to a known action, and may create an action record for the identified action and associate the action record with the intent record. In some embodiments, where the intent constructor 400 had stored information indicating that the agent 412 expected that the customer ID and the values for intent attributes "orderDate" and "productKeyword" (or "productCategory" or "orderDetails," etc.) constituted sufficient information to identify one or more orders in the customer's order history, the intent constructor 400 may update the intent/action record with information confirming that queries with just these query terms can be successful (i.e., can cause the user CRM to return at least one order identifier for an order that matched the query terms). The speech sampler 402 or action monitor 404 may detect that the agent 412 provides an indication to the customer 410 that the order was cancelled at reference 461; the intent constructor 400 may create another action record for this confirmatory communication as described above.

Figure 5:
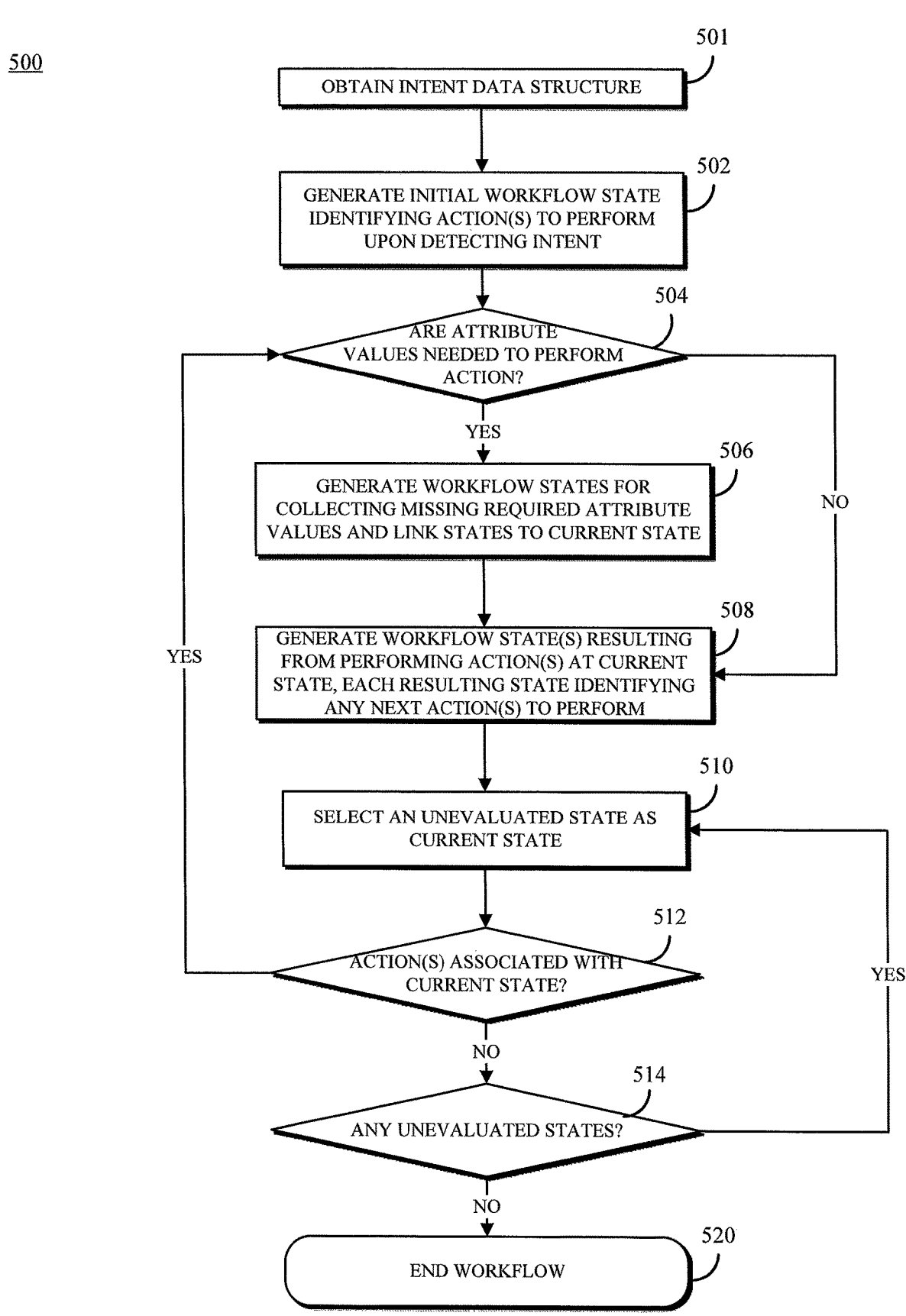
FIG. 5 is a flowchart of another example method for automatically generating a workflow for an intent.

FIG. 5 illustrates an example method 500 of automatically generating one or more contact workflows executable by an automated service agent based on an intent data structure, such as an intent record as described above. At 501 the system obtains the intent data structure, such as by querying an intent data store where the intent structure is stored, or by automatically beginning the method 500 after the intent constructor has created a new intent record for an intent that was not previously recognized by the system. At 502 the system generates an initial workflow state for the contact workflow. In some embodiments, the initial workflow state may indicate a first action to be performed in response to the agent detecting the intent. In some embodiments, the first action to be performed (i.e., identified by the initial workflow state) may be to invoke the automated service agent that has been (or will be) configured to execute the contact workflow for the intent.

At 504 the system may determine whether any intent attributes must have their associated values identified before the next action can be performed. For example, if the action is to call an API to a service or a user CRM, and the API requires one or more arguments that enable the service or CRM to identify the data to be changed or returned, the values for the intent attributes associated with the arguments must be collected in intermediate workflow states before the action can be performed. In this case, at 506 the system may generate the corresponding workflow states for collecting the required values. For example, if a value must be provided by the customer, the system may generate a workflow state comprising information for prompting the customer to provide the value, receiving the customer's response, and determining whether the input includes the requested value. In another example, if a value can be obtained by querying one or more data stores, such as a knowledge base associated with the user, the system may generate a workflow state identifying the query action and the arguments needed.

After 506, or if no intermediate workflow states are needed for collecting intent attribute values, at 508 the system may generate one or more workflow states that result from performing the action(s) at the current workflow state; these subsequent workflow states may represent and identify the next action to perform for each result in the set of valid results of performing the current action(s). For example, where the current action is a database query, the system may determine, based on the activity data, that there are three possible responses to the query: zero results, one result, and multiple results. The system may further determine that a different action should be performed in response to each of the three responses: if there are zero results, report this to the customer and ask the customer to re-enter values; if there is one result, perform the next action associated with the intent using the returned result; and, if there are multiple results, list the results for the customer and enable the customer to select the proper result. The system may create three workflow states and create transitioning connections from the current workflow state to each of the three new states, each based on the result of the current query. The system may further identify the action to be performed at each of the next workflow states.

The new workflow states are "unevaluated," in that the system has not determined what to do next after the corresponding action(s) is/are performed. At 510, the system may select one of the unevaluated workflow states in the contact workflow. At 512, if there are actions associated with the selected state (i.e., the new "current state"), the system returns to 504 to evaluate the actions. If there are no actions associated with the current state, the state is a termination state that ends the contact workflow; the system may then at 514 determine whether there are any other unevaluated workflow states in the contact workflow, returning to 510 if so. If there are no more workflow states to evaluate, the system at 520 may stop creating the contact workflow and may save the contact workflow for later deployment in one or more contact centers.

FIG. 6 illustrates an example visualization 600 of a contact workflow or set of contact workflows that may be generated by the present systems and methods to enable one or more automated service agents to resolve customer service issues/requests. In some embodiments, the visualization 600 may be considered to show a contact workflow comprised of a series of interconnected contact workflows 602, 604, 606, 608, 610, 699; a single automated service agent may be generated to execute all of the contact workflows 602-699, or only some of the workflows 602-699, or a single one of the workflows 602-699. For example: a first automated service agent may be generated to execute a contact workflow 602 generated for responding to a customer request to speak to a live/human service agent; a second automated service agent may be generated to execute a contact workflow 604 generated for prompting the customer to state the intent, and then routing the contact to the applicable automated service agent/contact workflow; a third automated service agent may be generated to execute a contact workflow 606 generated for responding to a customer request to receive the customer's account balance; a fourth automated service agent may be generated to execute a contact workflow 608 generated for responding to a customer request to receive a status of an order; a fifth automated service agent may be generated to execute a contact workflow 610 generated for responding to a customer request to cancel an order (including workflow states associated with the identified actions described in FIG. 4, for example); a sixth automated service agent may be generated to execute a contact workflow 699 generated for closing out a contact; and so on.

In some embodiments, more than one automated service agent and/or more than one contact workflow may be generated and stored for automatically servicing existing and/or newly-discovered intents. Within a set of automated service agents for servicing an intent, the agents may be differentiated from each other based on conversational interface settings of each agent that are specified in the automated service agent data structure. Using the conversational interface settings, an automated service agent may interact with the customer and/or with a companion human agent in different ways; the settings may be selected to optimize interactions in different scenarios. Non-limiting examples of conversational interface settings include: language spoken; voice (i.e., selected from a set of preprogrammed voices having different characteristics such as gender, age, accent, pitch, and cadence); speaking speed; level of expertise; speaking tone/degree of formality; duration of pauses while waiting for input; thresholds for customer input errors, repeated prompts, etc., before transferring to a human agent, etc. Additionally or alternatively, the values of certain conversational interface settings may be determined at the time the automated service agent is deployed or invoked. Similarly, a set of contact workflows for a given intent may be differentiated by the workflow states they contain. For example, a first contact workflow may fully automate the contact from start to finish, while a second contact workflow automates only part of the contact before transitioning the contact to a human agent, and a third contact workflow transitions the contact to a human agent immediately and then monitors the human agent's interactions with the customer in order to collect feedback data and refine the corresponding data model(s) as described below.

The selection of which automated service agent and/or which contact workflow to invoke for a given contact may be determined based on an input context 601 identified by the contact center system after the contact with the customer is established. An input context 601 may include multiple data points that help the system determine the proper servicing for the contact. Non-limiting example data points include: customer-related context, drawn from user systems, user data, or contact center data, such as a contact history (e.g., call frequency, trends related to expressed intents in previous calls, agent notes or performance metrics from previous contacts with customer), customer satisfaction and/or system performance data associated with the customer, purchase history, etc.; call-related context, such as time of day or year, traffic volume in contact center, number of available qualified human agents, detected sentiment of customer, originating platform of contact (e.g., from a "contact us" link on corporate website, or a phone number or hyperlink provided in an advertising campaign) etc.; agent-related context, such as agent training, expertise, or performance data; and the like. In one example, activity metrics related to past inbound and/or outbound contacts with the customer may indicate that servicing the contact is more efficient and the customer is more satisfied when an agent having a certain demeanor or communication style services the contact; the system may determine whether an automated service agent programmed with that demeanor or style is available, and deploy it. In another example, the normal contact workflow for a given intent may be fully automated, but the system may determine via sentiment analysis (as described above) that the customer is irate or frustrated; the system may instead select a contact workflow where the automated service agent pre-fetches certain data automatically, and then transitions the contact to a human agent while also presenting the pre-fetched data to the human agent via user interface.

A contact center service that manages execution of the contact workflows and automated service agents may access information needed to determine which workflows and/or agents to invoke. For example, a "master" contact workflow may be stored as a lookup table or other data record comprising identifiers for each of the contact workflows 602-699 and the identifier for the agent to be invoked when each contact workflow 602-699 is called; a master automated service agent may be created to perform automated functions for determining (e.g., based on the input context 601 as described above) the proper automated service agent(s) to invoke. In another embodiment, each contact workflow 602-699 may include information (e.g., stored in the appropriate workflow state) identifying the contact workflow to invoke in response to the customer input. Additionally or alternatively, the initial workflow state or another suitable workflow state in each contact workflow 602-699 may include an action to invoke an automated service agent, along with the identifier and/or other configuration data for the agent.

Figure 7:
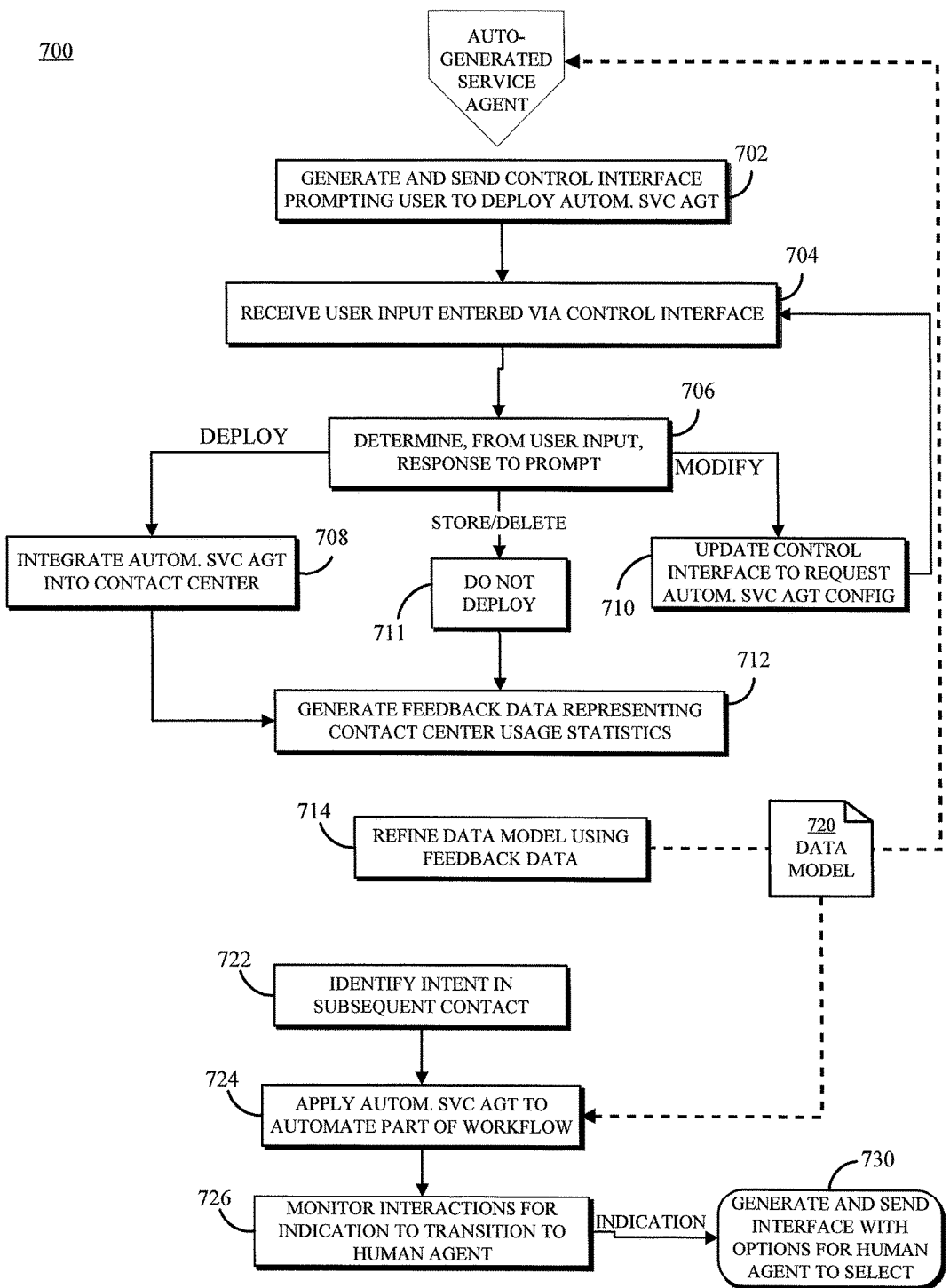
FIG. 7 is a flowchart of an example method for incorporating user feedback into a data model for a computerized service agent.

FIG. 7 illustrates an example method 700 of modifying and deploying automated service agents, incorporating user feedback to predictive actions to update the data model, and using the data model to monitor the progress of a new execution (e.g., at the beginning of a new project) of the contact workflow. In some embodiments, the method 700 may be performed subsequent to at least a first iteration of automated service agent generation as described above. For example, the automated service agent engine may produce a data model of the activity data, the data model identifying the behavior pattern based on the executed interactions; the system may generate and configure automated service agents based on the data model, the automated service agents in some embodiments serving as inputs to the method 700.

At 702, the system may generate a user interface for display on a computing device of the first user. The user interface may be a control interface for controlling the automation of tasks and/or interactions in various workflows using automated service agents. The user interface may include a prompt for the user to indicate whether to deploy, modify, store, or delete an existing automated service agent. The user interface may enable the first user to accept or reject the recommendation to automate the interaction. At 704, the system may receive user input from the computing device, which the first user entered in response to the prompt. At 706, the system may determine the user's choice, embodied in the user input. If the recommendation is accepted, at 708 the system may proceed with integrating the automated service agent into the user's contact center environment; generally, integrating may include configuring the automated service agent for deployment and scheduling/executing deployment of the automated service agent so that the automated service agent is invoked to execute the contact workflow when the contact center service detects the associated intent in the customer's natural language input.

If the user instead chooses to modify one or more parameters (e.g., configuration settings, or workflow states), at 710 the system may update the control interface to display interactive screens enabling the user to enter modified values for various parameters associated with the automated service agent, the intent, or the contact workflow. The system returns to 704 to receive the updated data structures. If the user chooses to store or delete (i.e., to not deploy) the automated service agent, at 711 the system may perform one or more tasks aborting the deployment.

At 712, the system may generate feedback data representing subsequent usage of the contact center, whether or not the automated service agent was deployed. That is, if the automated service agent was deployed, the feedback data includes data describing the automated service agent's interactions with customers; and, if the automated service agent was not deployed, the feedback data includes data describing the continued human agent servicing of the customer contacts. The feedback data may include other information associated with the automated service agent operation, the contact workflow, or the first user's decision and/or user input (i.e., into the control interface), which may be useful in refining the data model. The control interface or another interface may additionally enable the user to stop or modify previously deployed automated service agents and/or workflows; the associated user input may be used (as in step 712) to generate positive or negative (or neutral) feedback data pertaining to the stopped or modified automations.

At 714, the system may refine the data model 720 based on the feedback data. In some embodiments, the feedback data may be included in the ongoing (e.g., real-time) predictive analysis that produces the data model 720 or other predictive data. For example, the feedback data may be included in the activity data used for evaluating user and/or customer behavior in a feedback loop. In particular, the user input that triggered generation of the feedback data may be treated like any other interaction, and the feedback data may be formatted as one or more event messages and/or interaction records. The system may then use the refined data model 720 to refine the operations and performance of the automated service agent; the method 700 may begin again, receiving the new automated service agent as input.

FIG. 7 further illustrates another example use of the initial or refined data model 720: predicting the progress of execution of the contact workflow, and monitoring a series of interactions executing the workflow to determine whether the data model is correct. At 722, the system may receive a request and determine that the request initiates a new execution of the contact workflow. For example, a master automated agent configured to route contacts to automated and human service agents may detect the intent and determine the associated contact workflow that should be executed. At 724, the system may identify, using the data model 720, the expected progression of activity during execution of the contact workflow by the automated service agent. For example, the system may use the data model 720 to generate a prediction describing the interactions that are expected to be requested (i.e., subsequent to the request initiating the workflow) in order to perform the new execution. At 726, the system may then monitor the ongoing interactions to determine whether they satisfy the prediction (i.e., conform to the expected activity). For example, the system may receive subsequent (i.e., after initiating request) requests to perform new interactions associated with the contact workflow; while receiving the subsequent requests, the system monitors the new execution of the contact workflow to determine whether the data model is satisfied or violated by the new interactions. At 730, responsive to a determination that the data model is violated by the new interactions, or responsive to an indication that the automated service agent reached a workflow state for transitioning the contact to a human agent, the system may generate a notification in a user interface indicating that a human agent should take over execution of the contact workflow and send the user interface to a computing device associated with an available user agent or to a contact queue if no user agent is available.

Figure 8:
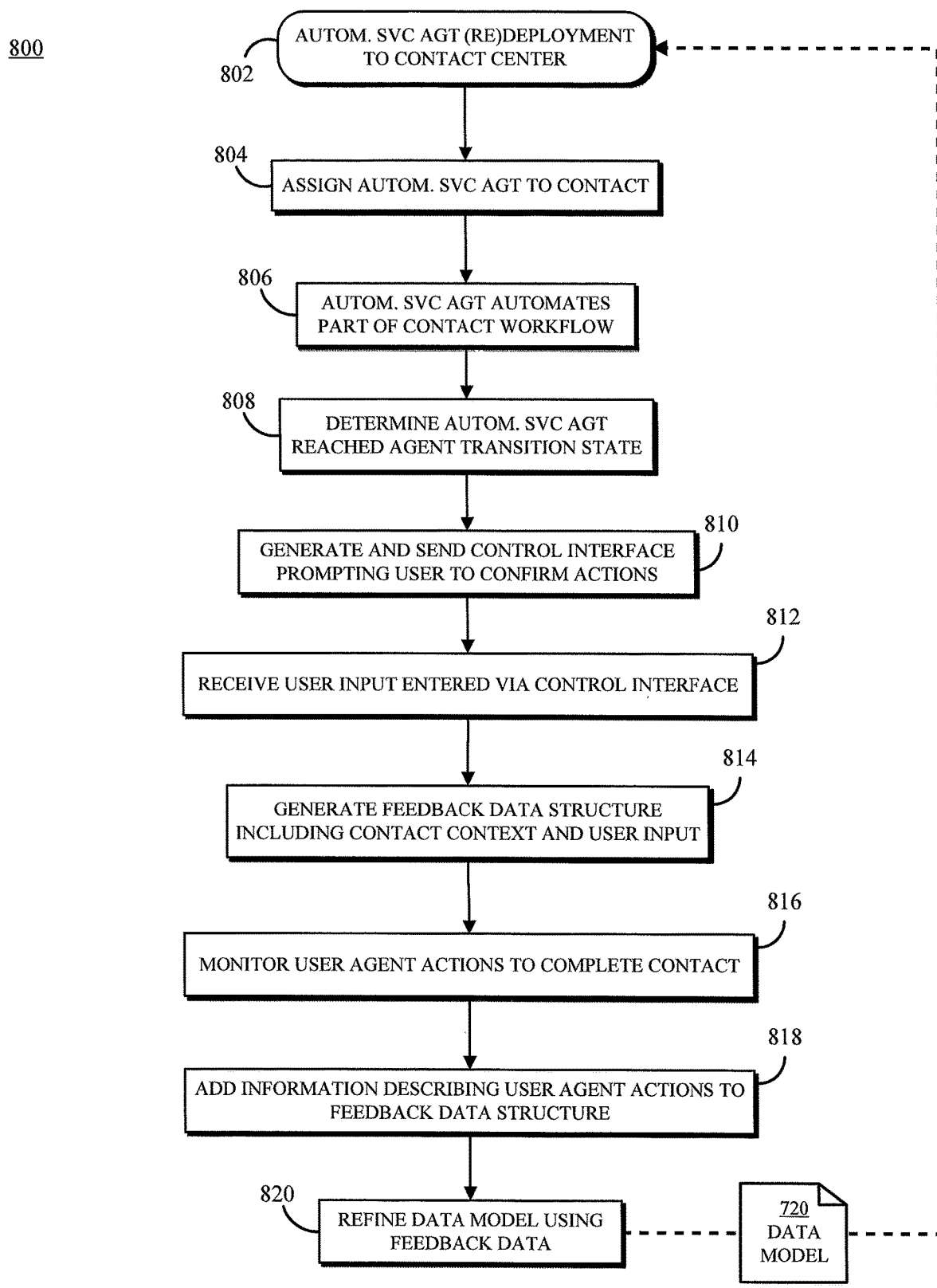
FIG. 8 is a flowchart of another example method for incorporating user feedback into a data model for a computerized service agent.

FIG. 8 illustrates an example method 800 for implementing aspects of the feedback loop described with respect to FIG. 7 or another feedback loop. In some embodiments, at 802 the system has deployed an automated service agent to a user's contact center as described above. At 804, the system assigns the automated service agent to a new or active contact on the contact center; for example, the system identifies the contact workflow to be executed, determines that the automated service agent is configured to execute the contact workflow, and launches an instance of the automated service agent with a configuration to service the contact. The automated service agent begins to execute the contact workflow, and at 806 has automated at least part of the workflow. At 808 the system determines that the automated service agent has reached a workflow state in which the next action or combination of actions is to transition the contact to a human service agent.

In some embodiments, the "transition" workflow state may comprise a planned transition to a human agent, such as when the subsequent actions to be performed are unknown to the automated service agent and/or are not present in the contact workflow. In another example, the automated service agent may be newly programmed, or user systems may have undergone an upgrade or modification, such that confirmation of the automated service agent's actions by a human agent would be advantageous. Thus, at 810 the system may generate a user interface comprising one or more control screens that summarize the status of the contact (e.g., the input context, the actions performed and data collected, etc.) and may send the user interface to the computing device of the receiving agent. The user interface may further include one or more prompts, such as confirmation prompts indicating that the automated service agent correctly or incorrectly performed the automated tasks, or that the expected next action (i.e., predictive data generated by the system identifying but not executing the expected next action) is correct or incorrect. At 812 the system may receive user input entered by the receiving agent in response to the prompts, and at 814 the system may parse the user input into feedback data and generate a data structure storing the feedback data.

At 816 the system may continue monitoring the agent interactions performed to complete the transferred contact. At 818 the system may collect and parse the monitored data to produce additional feedback data, and may store the additional feedback data in the data structure. At 820, while gathering the feedback data or after the contact is completed, the system may incorporate the feedback data structure into the data model 720 to improve the contact workflow automation. For example, if the system has collected enough data verifying that the actions taken by the human agent (monitored at 816) are frequently performed and/or resulted in customer satisfaction, the system may generate/update intent records, action records, workflow states of the contact workflow, and the automated service agent configuration, so that the automated service agent can automatically perform the actions in subsequent contacts expressing the intent.

Figure 9:
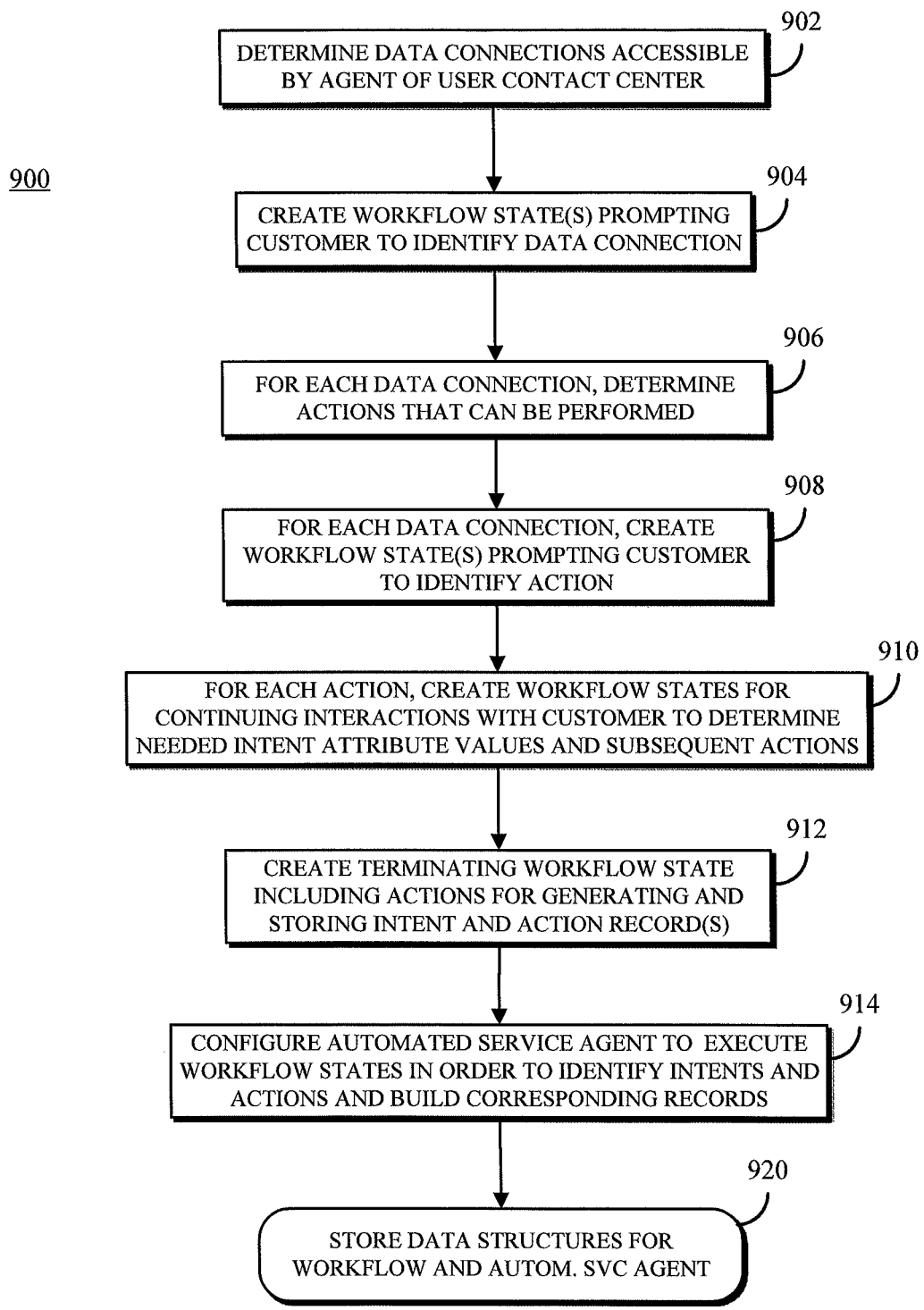
FIG. 9 is a flowchart of an example method for creating a workflow and a computerized service agent for automating identification of a customer intent, service agent actions that respond to the intent, and a workflow for a computerized service agent to apply when serving a customer contact having the intent.

FIG. 9 provides an example method 900 for automatically generating contact workflows and automated user agents, which may be an alternative or may be used in conjunction with the method 300 of FIG. 3 in which the system uses recorded past activity to identify intents. In the method 900, the system generates a "self-forming" service agent that, at least at first, has little or no historical data from which to train. As illustrated, the system generates the service agent to develop new service agents, but alternatively the system may generate the service agent to refine itself, or to generate contact workflows, or to generate intent records that the system uses to refine the self-forming agent. The contact workflow and automated user agent generated in the method 900 may be categorized as "experimental:" as part of the automated interactions, the experimental agent may be configured to identify itself to the customer as an experimental agent, and to ask the customer whether the customer would like to help train the experimental agent or be transferred to another functional agent.

At 902, the system determines the data connections that are available to the contact center of a user of the computing resource service provider. For example, the system may determine that user agents of a contact center can access computing resource service provider data and services, as well as user CRM systems and data, as illustrated in FIG. 1. The system may further use existing contact workflows, configuration settings of the contact center, user-provided information, etc., to determine a set of data subsystems that the service agents can interact with using the data connections of the contact center.

At 904 the system may create one or more workflow states of a contact workflow. A first workflow state may collect an utterance from the customer that will be used to identify the new intent; the next set of states may include prompts to the customer to identify which data subsystem or data connection the customer thinks is associated with the expressed intent. For example, if the available data connections are to a user account data subsystem, a billing subsystem, a payment subsystem, and a subscribed-service subsystem, a second workflow state may list these to the customer and prompt the customer to identify the correct-sounding one. Thus, if the customer first states, "I want my savings account balance," the contact workflow instructs the automated service agent to process and store the utterance, and to respond with "I've not familiar with that that term, but I can access these systems. Which one sounds like the one you need?" plus a vocalization identifying each subsystem.

At 906, the system may determine, for each of the data connections, the set of actions that can be performed over the data connection. For example, the system may access the contact center configuration to determine the corresponding set of API calls that user agents are authorized to execute against each subsystem. At 908 the system may create one or more workflow states identifying the available actions to the customer and prompting the customer to identify which action is associated with the intent, as described above. At 910 the system may determine which actions are associated with following actions, or require values for certain intent attributes, and may create workflow states for collecting each required value and performing each subsequent action, until the available actions have been fully characterized in the contact workflow.

At 912, the system may create one or more terminating workflow states that is/are performed once the intent, intent attributes, and action(s) have been determined via interactions between the automated service agent and the customer. The terminating workflow states may define terminating actions, such as instructions for storing the intent records and action record generated by the automated service agent while executing the contact workflow. At 914, the system may configure the experimental agent and the experimental contact workflow as described above with respect to FIG. 3, and at 920 the system may store the corresponding contact workflow and experimental agent data structures in a suitable contact center data store.

Figure 10:
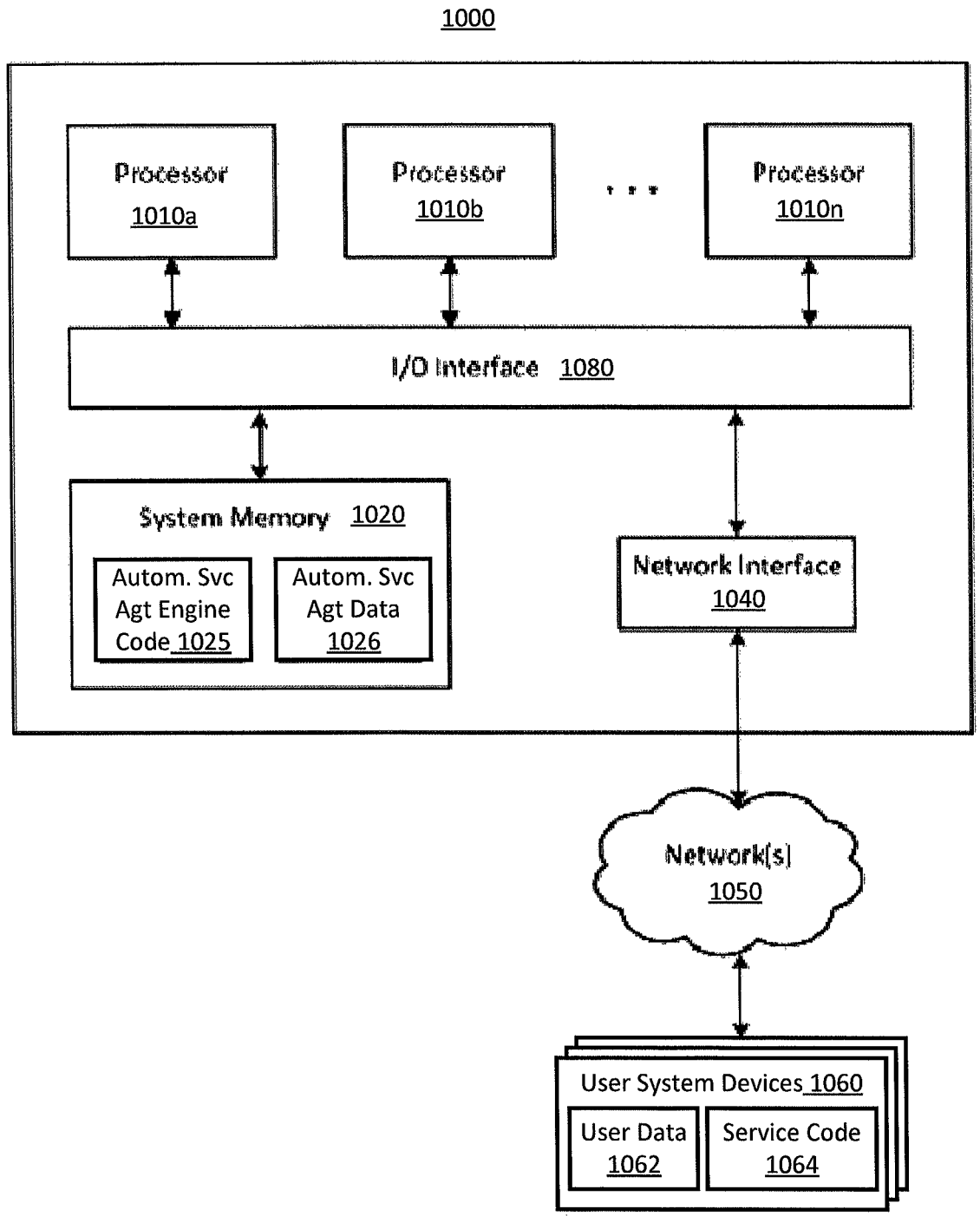
FIG. 10 is a block diagram depicting functional components of a general-purpose computing device.

In at least some embodiments, a computing device that implements a portion or all of one or more of the technologies described herein, including the techniques to implement the functionality of a system for automatically generating automated service agents and optimizing workflows based on behavior patterns in user activity, can include a general purpose computer system that includes or is configured to access one or more computer-accessible media. FIG. 10 illustrates such a general-purpose computing device 1000. In the illustrated embodiment, computing device 1000 includes one or more processors 1010a, 1010b, and/or 1010n (which may be referred herein singularly as "a processor 1010" or in the plural as "the processors 1010") coupled to a system memory 1020 via an input/output (I/O) interface 1080. Computing device 1000 further includes a network interface 1040 coupled to I/O interface 1080.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, Power PC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods techniques, and data described above, are shown stored within system memory 1020 as code 1025 and data 1026. In particular, in some embodiments the code 1025 may comprise machine-readable and executable program instructions and other source code for implementing an automated service agent engine that automatically generates contact workflows and automated service agents as described above; and, the data 1026 may comprise at least the data structures generated by the automated service agent engine for implementing one or more automated service agents in the contact centers of computing resource service provider users (e.g., launching instances of an automated service agent into a virtual computing environment of a user).

In one embodiment, I/O interface 1080 may be configured to coordinate I/O traffic between processor 1010, system memory 1020, and any peripheral devices in the device, including network interface 1040 or other peripheral interfaces. In some embodiments, I/O interface 1080 may perform any necessary protocol, timing, or other data transformations to convert data signals from one component (e.g., system memory 1020) into a format suitable for use by another component (e.g., processor 1010). In some embodiments, I/O interface 1080 may include support for devices attached through various types of peripheral buses, such as a variant of the Peripheral Component Interconnect (PCI) bus standard or the Universal Serial Bus (USB) standard, for example. In some embodiments, the function of I/O interface 1080 may be split into two or more separate components, such as a north bridge and a south bridge, for example. Also, in some embodiments some or all of the functionality of I/O interface 1080, such as an interface to system memory 1020, may be incorporated directly into processor 1010.

Network interface 1040 may be configured to allow data to be exchanged between computing device 1000 and other device or devices 1060 attached to a network or network(s) 1050, such as other computer systems or devices as illustrated in FIG. 1, for example. More particularly, the network interface 1040 may enable communication with systems and devices 1060 of users of the computing resource service provider; such systems may include CRMs and other customer data systems, product inventory systems, and other sources of user data 1062. Program code 1064 for executing functions and services in conjunction with the automated service agent engine may also be stored and executed on the user systems and devices 1060. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fiber Channel SANs or via any other suitable type of network and/or protocol.

In some embodiments, system memory 1020 may be one embodiment of a computer-accessible medium configured to store program instructions and data for implementing embodiments of the present methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1080. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals such as electrical, electromagnetic or digital signals, conveyed via a communication medium such as a network and/or a wireless link, such as may be implemented via network interface 1040. Portions or all of multiple computing devices, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

Thus, in one aspect, the description herein provides a system including one or more hardware computing devices having a processor and memory storing specific computer-executable instructions that, when executed by the processor, cause the system to: receive activity data describing recorded activity on a virtualized contact center implemented by a contact center system of a computing resource service provider and associated with a user of the computing resource service provider, the recorded activity including a plurality of interactions by one or more service agents of the contact center with the contact center system and with one or more customers of the user, the plurality of interactions having been performed in order to satisfy one or more customer service requests; identify, from a plurality of natural language inputs provided by the one or more customers during the plurality of interactions, a first intent representing a customer service issue associated with a first request of the one or more customer service requests; identify a first pattern in the plurality of interactions, the first pattern indicating that the one or more service agents responded to each of the plurality of natural language inputs by performing a first action on the contact center system; determine a contact workflow describing, in a format that renders the contact workflow executable by the contact center system, a plurality of potential interactions that are logically connected in a progression in order to satisfy future customer service requests having the first intent, the plurality of potential interactions including the first action; generate an automated service agent data object including program code for executing the contact workflow to automatically perform the first action on the contact center system; configure the automated service agent data object to produce a first automated service agent that executes in a computing environment of the contact center; and, cause the contact center system to deploy the first automated service agent into the computing environment, such that the first automated service agent autonomously services one or more of the future customer service requests having the first intent.

The system may further include an electronic data store in electronic communication with the contact center system and storing a plurality of intent records each associated with a corresponding intent of a plurality of intents that are known to the contact center system. To identify the first intent, the instructions, when executed by the processor, may further cause the system to: identify, in the plurality of natural language inputs, a customer utterance that occurs in each of the plurality of natural language inputs; query the electronic data store using the customer utterance to determine that the customer utterance does not identify any of the plurality of intents; and, create a first intent record including the first intent and the customer utterance. The system may further be caused to: store data describing the first action in the first intent record, and store the first intent record in the electronic data store as one of the plurality of intent records. To identify the first intent, the instructions, when executed by the processor, may further cause the system to: identify occurrences of the first action in the activity data; identify, from the plurality of interactions, a subset of interactions that precede the occurrences of the first action; and, obtain the plurality of natural language inputs from the subset of interactions.

The instructions, when executed by the processor, may further cause the system to: determine, based on the activity data, that the first action is associated with a first computer program routine that the one or more service agents cause the contact center system to invoke; determine a set of access parameters that enable an invocation of the first computer program routine; configure a first interaction of the plurality of potential interactions, the first interaction being associated with the first action, to recite the invocation of the first computer program routine; and, to generate the automated service agent data object, include the set of access parameters in the automated service agent data object. The contact workflow may include a plurality of workflow states, and the instructions, when executed by the processor, may cause the system to: identify, based on one or both of the invocation of the first computer program routine and the plurality of natural language inputs, an intent attribute associated with the first intent and having a variable value that is passed to the first computer program routine to cause the first computer program routine to produce a result associated with the value; and, to determine the contact workflow, create a first workflow state associated with receiving a first customer input expressing the first intent, create a second workflow state including instructions for obtaining a customer-supplied value for the intent attribute from the first customer input, create a third workflow state including instructions for prompting a customer to provide the customer-supplied value and receiving a second customer input in response, the second workflow state transitioning to the third workflow state when the first customer input does not contain the customer-supplied value, create a fourth workflow state connecting to the third workflow state and including instructions for determining the customer-supplied value from the second customer input, and create a fifth workflow state including instructions for executing the invocation of the first computer program routine using the customer-supplied value and receiving the result, the fourth workflow state connecting to the fifth workflow state, and the second workflow state transitioning to the fifth workflow state when the first customer input contains the customer-supplied value.

In another aspect, the present description provides a system including one or more hardware computing devices having physical computing resources including a processor and memory storing specific computer-executable instructions that, when executed by the processor, cause the system to implement, within an allocation of the physical computing resources, a contact center system. The contact center system: receives activity data describing at least a first contact of a plurality of contacts between customers and service agents, the plurality of contacts being executed on one or more virtualized contact centers; identifies, based at least in part on the activity data, an intent of the plurality of contacts, the intent associated with an outcome of the first contact that is desired by a first customer; generates, based at least in part on the activity data, a plurality of workflow state data structures each representing a corresponding potential interaction of a plurality of potential interactions between the service agents, the customers, and the contact center system; creates logical connections between the plurality of workflow state data structures to produce a first contact workflow with a progression that satisfies the intent; generates an automated service agent including program code for executing the first contact workflow within the contact center system; and, responsive to an invocation command associated with a first contact center of the one or more virtualized contact centers, causes the first contact center to deploy an instance of the automated service agent to service a future contact that expresses the intent.

The activity data may include aggregated activity data describing a set of interactions associated with the plurality of contacts, the set of interactions including a plurality of inputs, including service agent inputs and customer inputs, entered to either initiate or respond to actions on the contact center system. The contact center system implemented by the system further: identifies the intent from the inputs; identifies, in the set of interactions, a pattern indicating that the service agents execute a first action on the contact center system in response to a first of the customer inputs expressing the intent; and, generates a first workflow state of the plurality of workflow states to include data identifying the intent as a trigger to enter the first workflow state and the first action as a task to perform to complete the first workflow state. To identify the intent, the contact center system implemented by the system may: identify from the plurality of inputs a set of the customer inputs submitted by customers in response to one or more prompts to state the customer service issue; identify a phrase common to the set of customer inputs; compare the phrase to corresponding identifier phrases each associated with one of a plurality of previously identified intents that the contact center system is configured to process; and, responsive to a determination that the phrase does not match any of the corresponding identifier phrases, create the intent and associate the phrase as the corresponding identifier phrase of the intent. The contact center system implemented by the system further may add the intent to the plurality of previously identified intents and associates the first contact workflow and the automated service agent with the intent. The contact center system may further identify, from one or both of the inputs and the first action, an intent attribute associated with the intent and having a variable value that is used by the service agents to perform the first action. To produce the contact workflow, the contact center system: generates a first workflow state data structure including instructions for obtaining a customer-supplied value for the intent attribute from a first customer input; generates a second workflow state data structure including instructions for prompting a customer to provide the customer-supplied value and receiving a second customer input in response, the first workflow state data structure transitioning to the second workflow state data structure when the first customer input does not contain the customer-supplied value; generates a third workflow state data structure including instructions for determining the customer-supplied value from the second customer input, and connects the second workflow state data structure to the third workflow state data structure; and, generates a fourth workflow state data structure including instructions for executing the first action using the customer-supplied value and receiving the result, connects the third workflow state data structure to the fourth workflow state data structure, and connects the first workflow state data structure to the fourth workflow state data structure when the first customer input contains the customer-supplied value.

The contact center system implemented by the system may generate a first workflow state data structure including instructions for issuing the invocation command, the first workflow state data structure representing an initial workflow state of the contact workflow. The activity data may include recorded voice calls between the service agents and the customers, and the contact center system implemented by the system may further cause a transcription service to convert the recorded voice calls into text data, the contact center system identifying the intent from the text data. The activity data may include recorded voice calls between the service agents and the customers, and the contact center system implemented by the system further: determines, based on the activity data associated with the first contact, that a first service agent performed a second action that is abnormal from the plurality of contacts; detects, in a first voice call of the recorded voice calls, the first voice call associated with the first contact, a first sentiment of a first customer conducting the first voice call; generates a second contact workflow based on the first contact workflow and invoking the second action; and, updates the first contact workflow to include instructions to detect sentiment of a contacting customer and, if the sentiment is the first sentiment, transition the contact to the second contact workflow. The contact center system implemented by the system further: collects performance data associated with execution of the first contact workflow by the instance of the automated service agent while servicing future contacts; analyzes the performance data to produce one or more optimizations of the first contact workflow; and, modifies the first contact workflow according to the one or more optimizations.

In yet another aspect, the present description provides a system for automating responses to a customer service issue. The system including one or more hardware computing devices having physical computing resources including a processor and memory storing specific computer-executable instructions that, when executed by the processor, cause the system to implement, within an allocation of the physical computing resources, a contact center service and an automated service agent engine. The contact center service: configures and deploys virtualized contact centers each associated with a corresponding user of a plurality of users of a computing resource service provider; records interactions between service agents and customers within contacts hosted by the contact centers; receives requests to perform actions associated with the contacts; executes the actions based on the requests; generates activity data describing recorded interactions and executed actions; and, launches instances of an automated service agent into the contact centers to autonomously connect to a first customer expressing the customer service issue and execute a contact workflow to resolve the customer service issue. The automated service agent engine: obtains the activity data from the contact center system; analyzes the activity data to produce a data model of the activity data for the contacts associated with the customer service issue; generates, based at least in part on the data model, the contact workflow including a plurality of workflow states associated with service agent actions and customer responses and connected in a progression that satisfies the customer service issue; and, generates the automated service agent including program code for executing the contact workflow within the contact center service.

The activity data may describe a set of interactions associated with the previous contacts on a first contact center associated with a first user of the plurality of users, the set of interactions including a plurality of inputs, including service agent inputs and customer inputs, entered to either initiate or respond to actions of the contact center service. To analyze the activity data, the automated service agent engine: identifies, from the inputs, an intent representing an intended action of resolving the customer service issue; and identifies, in the set of interactions, a pattern indicating that the service agents execute a first action on the contact center service in response to a first of the customer inputs expressing the intent. The automated service agent engine further: queries an electronic data store storing a plurality of intent records each describing a corresponding intent of a plurality of intents recognized by the contact center service, the plurality of intent records being usable by the contact center service for servicing the corresponding call centers of some or all of the plurality of users, to determine that the intent is not stored in the plurality of intent records; determines, based at least in part on user account information associated with the first user, a classification of the intent; generates a first intent record including the intent, the classification, the inputs used to identify the intent, and the first action; and, stores the first intent record in the electronic data store as one of the plurality of intent records, the contact center service using the classification to identify a subset of the plurality of users for which the associated contact centers receive customers having the intent.

The contact center service further: generates a user interface for display on a computing device of a first user, the user interface including a prompt enabling the first user to allow or deny deployment of the automated service agent into a first contact center associated with the first user; receives user input from the computing device in response to the prompt; and, determines that the user input indicates the first user allows the deployment. The contact center service further may analyze the activity data to produce a plurality of performance metrics associated with servicing of past contacts on the contact centers. The automated service agent engine: obtains, as refinement metrics, the plurality of performance metrics produced by analyzing the activity data associated with the past contacts that were at least partially serviced by the automated service agent; produces feedback data based on the refinement metrics, the contact workflow, and the automated service agent program code, the feedback data describing changes to one or both of the contact workflow and the program code; and uses the feedback data to refine the data model.

To generate the contact workflow, the automated service agent engine: determines that the data model identifies a set of interactions; generates, of the plurality of workflow states, a first set of workflow states each including instructions for executing a corresponding interaction of the set of interactions; determines that the data model lacks information for automating a termination action that completes the contact workflow; generates a final workflow state of the plurality of workflow states, the final workflow state including instructions for transitioning a contact to another service agent; and, connects any of the plurality of workflow states that do not lead to termination to the final workflow state. The program code of the automated service agent may provide information describing execution of the set of interactions in a user interface displayed on a computing device of the human service agent. The final workflow state may further include instructions for: obtaining, from the contact center service, one or more agent metrics describing performance of the service agents in servicing the previous contacts on a first contact center; identifying, based on the one or more agent metrics, one or more preferred agents from the service agents, the one or more preferred agents being human agents or other automated service agents exhibiting high performance in servicing the previous contacts associated with the customer service issue; identifying, from the one or more preferred agents, a target agent that is active on the first contact center; and, transitioning the contact to the target agent.

Although subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes illustrated in the figures can be executed or performed in any order or sequence not limited to the order and sequence shown and described in the figures. Also, some of the above steps of the processes of the figures can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising one or more hardware computing devices having a processor and memory storing specific computer-executable instructions that, when executed by the processor, cause the system to:
   receive activity data describing recorded activity on a virtualized contact center implemented by a contact center system of a computing resource service provider and associated with a user of the computing resource service provider, the recorded activity comprising a plurality of interactions by one or more service agents of the contact center with the contact center system and with one or more customers of the user, the plurality of interactions having been performed in order to satisfy one or more customer service requests;
   identify, from a plurality of natural language inputs provided by the one or more customers during the plurality of interactions, a first intent representing a customer service issue associated with a first request of the one or more customer service requests;
   identify a first pattern in the plurality of interactions, the first pattern indicating that the one or more service agents responded to each of the plurality of natural language inputs by performing a first action on the contact center system;
   determine a contact workflow describing, in a format that renders the contact workflow executable by the contact center system, a plurality of potential interactions that are logically connected in a progression in order to satisfy future customer service requests having the first intent, the plurality of potential interactions including the first action;
   generate an automated service agent data object comprising program code for executing the contact workflow to automatically perform the first action on the contact center system;
   configure the automated service agent data object to produce a first automated service agent that executes in a computing environment of the contact center; and
   cause the contact center system to deploy the first automated service agent into the computing environment, such that the first automated service agent autonomously services one or more of the future customer service requests having the first intent.

2. The system of claim 1, further comprising an electronic data store in electronic communication with the contact center system and storing a plurality of intent records each associated with a corresponding intent of a plurality of intents that are known to the contact center system, wherein to identify the first intent, the instructions, when executed by the processor, further cause the system to:
   identify, in the plurality of natural language inputs, a customer utterance that occurs in each of the plurality of natural language inputs;
   query the electronic data store using the customer utterance to determine that the customer utterance does not identify any of the plurality of intents; and
   create a first intent record comprising the first intent and the customer utterance;
   the system further caused to:
   store data describing the first action in the first intent record; and
   store the first intent record in the electronic data store as one of the plurality of intent records.

3. The system of claim 2, wherein to identify the first intent, the instructions, when executed by the processor, further cause the system to:
   identify occurrences of the first action in the activity data;
   identify, from the plurality of interactions, a subset of interactions that precede the occurrences of the first action; and
   obtain the plurality of natural language inputs from the subset of interactions.

4. The system of claim 1, wherein the instructions, when executed by the processor, further cause the system to:
   determine, based on the activity data, that the first action is associated with a first computer program routine that the one or more service agents cause the contact center system to invoke;
   determine a set of access parameters that enable an invocation of the first computer program routine;
   configure a first interaction of the plurality of potential interactions, the first interaction being associated with the first action, to recite the invocation of the first computer program routine; and
   to generate the automated service agent data object, include the set of access parameters in the automated service agent data object.

5. The system of claim 4, wherein the contact workflow comprises a plurality of workflow states, and the instructions, when executed by the processor, cause the system to:
   identify, based on one or both of the invocation of the first computer program routine and the plurality of natural language inputs, an intent attribute associated with the first intent and having a variable value that is passed to the first computer program routine to cause the first computer program routine to produce a result associated with the value; and
   to determine the contact workflow:
   create a first workflow state associated with receiving a first customer input expressing the first intent;

create a second workflow state comprising instructions for obtaining a customer-supplied value for the intent attribute from the first customer input;

create a third workflow state comprising instructions for prompting a customer to provide the customer-supplied value and receiving a second customer input in response, the second workflow state transitioning to the third workflow state when the first customer input does not contain the customer-supplied value;

create a fourth workflow state connecting to the third workflow state and comprising instructions for determining the customer-supplied value from the second customer input; and create a fifth workflow state comprising instructions for executing the invocation of the first computer program routine using the customer-supplied value and receiving the result, the fourth workflow state connecting to the fifth workflow state, and the second workflow state transitioning to the fifth workflow state when the first customer input contains the customer-supplied value.

6. A system, comprising one or more hardware computing devices having physical computing resources including a processor and memory storing specific computer-executable instructions that, when executed by the processor, cause the system to implement, within an allocation of the physical computing resources, a contact center system that:

receives activity data describing at least a first contact of a plurality of contacts between customers and service agents, the plurality of contacts being executed on one or more virtualized contact centers;

identifies, based at least in part on the activity data, an intent of the plurality of contacts, the intent associated with an outcome of the first contact that is desired by a first customer;

generates, based at least in part on the activity data, a plurality of workflow state data structures each representing a corresponding potential interaction of a plurality of potential interactions between the service agents, the customers, and the contact center system;

creates logical connections between the plurality of workflow state data structures to produce a first contact workflow with a progression that satisfies the intent;

generates an automated service agent comprising program code for executing the first contact workflow within the contact center system; and responsive to an invocation command associated with a first contact center of the one or more virtualized contact centers, causes the first contact center to deploy an instance of the automated service agent to service a future contact that expresses the intent.

7. The system of claim 6, wherein the activity data comprises aggregated activity data describing a set of interactions associated with the plurality of contacts, the set of interactions including a plurality of inputs, including service agent inputs and customer inputs, entered to either initiate or respond to actions on the contact center system, and the contact center system implemented by the system further:

identifies the intent from the inputs;

identifies, in the set of interactions, a pattern indicating that the service agents execute a first action on the contact center system in response to a first of the customer inputs expressing the intent; and generates a first workflow state of the plurality of workflow states to include data identifying the intent as a trigger to enter the first workflow state and the first action as a task to perform to complete the first workflow state.

8. The system of claim 7, wherein to identify the intent, the contact center system implemented by the system:

identify from the plurality of inputs a set of the customer inputs submitted by customers in response to one or more prompts to state the customer service issue;

identify a phrase common to the set of customer inputs;

compare the phrase to corresponding identifier phrases each associated with one of a plurality of previously identified intents that the contact center system is configured to process; and responsive to a determination that the phrase does not match any of the corresponding identifier phrases, create the intent and associate the phrase as the corresponding identifier phrase of the intent;

wherein the contact center system implemented by the system further adds the intent to the plurality of previously identified intents and associates the first contact workflow and the automated service agent with the intent.

9. The system of claim 7, wherein the contact center system implemented by the system further identifies, from one or both of the inputs and the first action, an intent attribute associated with the intent and having a variable value that is used by the service agents to perform the first action.

10. The system of claim 9, wherein to produce the contact workflow, the contact center system implemented by the system:

generates a first workflow state data structure comprising instructions for obtaining a customer-supplied value for the intent attribute from a first customer input;

generates a second workflow state data structure comprising instructions for prompting a customer to provide the customer-supplied value and receiving a second customer input in response, the first workflow state data structure transitioning to the second workflow state data structure when the first customer input does not contain the customer-supplied value;

generates a third workflow state data structure comprising instructions for determining the customer-supplied value from the second customer input, and connects the second workflow state data structure to the third workflow state data structure; and generates a fourth workflow state data structure comprising instructions for executing the first action using the customer-supplied value and receiving the result, connects the third workflow state data structure to the fourth workflow state data structure, and connects the first workflow state data structure to the fourth workflow state data structure when the first customer input contains the customer-supplied value.

11. The system of claim 6, wherein the contact center system implemented by the system generates a first workflow state data structure comprising instructions for issuing the invocation command, the first workflow state data structure representing an initial workflow state of the contact workflow.

12. The system of claim 6, wherein the activity data comprises recorded voice calls between the service agents and the customers, and the contact center system implemented by the system further causes a transcription service to convert the recorded voice calls into text data, the contact center system identifying the intent from the text data.

13. The system of claim 6, wherein the activity data comprises recorded voice calls between the service agents and the customers, and the contact center system implemented by the system further:
  determines, based on the activity data associated with the first contact, that a first service agent performed a second action that is abnormal from the plurality of contacts;
  detects, in a first voice call of the recorded voice calls, the first voice call associated with the first contact, a first sentiment of a first customer conducting the first voice call;
  generates a second contact workflow based on the first contact workflow and invoking the second action; and
  updates the first contact workflow to include instructions to detect sentiment of a contacting customer and, if the sentiment is the first sentiment, transition the contact to the second contact workflow.

14. The system of claim 6, wherein the contact center system implemented by the system further:
  collects performance data associated with execution of the first contact workflow by the instance of the automated service agent while servicing future contacts;
  analyzes the performance data to produce one or more optimizations of the first contact workflow; and
  modifies the first contact workflow according to the one or more optimizations.

15. A system for automating responses to a customer service issue, the system comprising one or more hardware computing devices having physical computing resources including a processor and memory storing specific computer-executable instructions that, when executed by the processor, cause the system to implement, within an allocation of the physical computing resources:
  a contact center service that:
    configures and deploys virtualized contact centers each associated with a corresponding user of a plurality of users of a computing resource service provider;
    records interactions between service agents and customers within contacts hosted by the contact centers;
    receives requests to perform actions associated with the contacts;
    executes the actions based on the requests;
    generates activity data describing recorded interactions and executed actions; and
    launches instances of an automated service agent into the contact centers to autonomously connect to a first customer expressing the customer service issue and execute a contact workflow to resolve the customer service issue; and
  an automated service agent engine that:
    obtains the activity data from the contact center system;
    analyzes the activity data to produce a data model of the activity data for the contacts associated with the customer service issue;
    generates, based at least in part on the data model, the contact workflow comprising a plurality of workflow states associated with service agent actions and customer responses and connected in a progression that satisfies the customer service issue; and
    generates the automated service agent comprising program code for executing the contact workflow within the contact center service.

16. The system of claim 15, wherein:
  the activity data describes a set of interactions associated with the previous contacts on a first contact center associated with a first user of the plurality of users, the set of interactions including a plurality of inputs, including service agent inputs and customer inputs, entered to either initiate or respond to actions of the contact center service;
  to analyze the activity data, the automated service agent engine:
    identifies, from the inputs, an intent representing an intended action of resolving the customer service issue; and
    identifies, in the set of interactions, a pattern indicating that the service agents execute a first action on the contact center service in response to a first of the customer inputs expressing the intent; and
  the automated service agent engine further:
    queries an electronic data store storing a plurality of intent records each describing a corresponding intent of a plurality of intents recognized by the contact center service, the plurality of intent records being usable by the contact center service for servicing the corresponding call centers of some or all of the plurality of users, to determine that the intent is not stored in the plurality of intent records;
    determines, based at least in part on user account information associated with the first user, a classification of the intent;
    generates a first intent record comprising the intent, the classification, the inputs used to identify the intent, and the first action; and
    stores the first intent record in the electronic data store as one of the plurality of intent records, the contact center service using the classification to identify a subset of the plurality of users for which the associated contact centers receive customers having the intent.

17. The system of claim 15, wherein the contact center service further:
  generates a user interface for display on a computing device of a first user, the user interface comprising a prompt enabling the first user to allow or deny deployment of the automated service agent into a first contact center associated with the first user;
  receives user input from the computing device in response to the prompt; and
  determines that the user input indicates the first user allows the deployment.

18. The system of claim 15, wherein:
  the contact center service further analyzes the activity data to produce a plurality of performance metrics associated with servicing of past contacts on the contact centers; and
  the automated service agent engine:
    obtains, as refinement metrics, the plurality of performance metrics produced by analyzing the activity data associated with the past contacts that were at least partially serviced by the automated service agent;
    produces feedback data based on the refinement metrics, the contact workflow, and the automated service agent program code, the feedback data describing changes to one or both of the contact workflow and the program code; and
    uses the feedback data to refine the data model.

19. The system of claim 15, wherein to generate the contact workflow, the automated service agent engine:
  determines that the data model identifies a set of interactions;

generates, of the plurality of workflow states, a first set of workflow states each including instructions for executing a corresponding interaction of the set of interactions;

determines that the data model lacks information for automating a termination action that completes the contact workflow;

generates a final workflow state of the plurality of workflow states, the final workflow state including instructions for transitioning a contact to another service agent; and connects any of the plurality of workflow states that do not lead to termination to the final workflow state;

the program code of the automated service agent providing information describing execution of the set of interactions in a user interface displayed on a computing device of the human service agent.

20. The system of claim 19, wherein the final workflow state further includes instructions for:

obtaining, from the contact center service, one or more agent metrics describing performance of the service agents in servicing the previous contacts on a first contact center;

identifying, based on the one or more agent metrics, one or more preferred agents from the service agents, the one or more preferred agents being human agents or other automated service agents exhibiting high performance in servicing the previous contacts associated with the customer service issue;

identifying, from the one or more preferred agents, a target agent that is active on the first contact center; and transitioning the contact to the target agent.

* * * * *